(12) United States Patent
Ke et al.

(10) Patent No.: US 12,388,526 B2
(45) Date of Patent: Aug. 12, 2025

(54) METHOD AND SYSTEM FOR COMPRESSING AND EMPLOYING PATTERN DEPENDENT LOOK-UP TABLE

(71) Applicant: HUAWEI TECHNOLOGIES CO., LTD., Guangdong (CN)

(72) Inventors: Jianhong Ke, Stittsville (CA); Hongliang Li, Dollard-Des-Ormeaux (CA); Xuefeng Tang, Kanata (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 18/181,819

(22) Filed: Mar. 10, 2023

(65) Prior Publication Data
US 2024/0305375 A1    Sep. 12, 2024

(51) Int. Cl.
| | |
|---|---|
| H04B 10/00 | (2013.01) |
| G06N 20/00 | (2019.01) |
| H04B 10/2507 | (2013.01) |
| H04J 14/00 | (2006.01) |

(52) U.S. Cl.
CPC ......... *H04B 10/2507* (2013.01); *G06N 20/00* (2019.01)

(58) Field of Classification Search
CPC .......................... H03F 2201/3233; H04B 1/62
See application file for complete search history.

(56) References Cited

U.S. PATENT DOCUMENTS

| | | | | |
|---|---|---|---|---|
| 2004/0252783 | A1* | 12/2004 | Kim | H04L 27/368 |
| | | | | 375/296 |
| 2013/0243125 | A1* | 9/2013 | Matsubara | H03F 1/3247 |
| | | | | 375/297 |
| 2019/0149393 | A1* | 5/2019 | Yu | H04B 10/0799 |
| | | | | 375/296 |

FOREIGN PATENT DOCUMENTS

EP       3249819 A1    11/2017

\* cited by examiner

*Primary Examiner* — Daniel G Dobson
(74) *Attorney, Agent, or Firm* — BCF LLP

(57) ABSTRACT

The disclosed systems, and methods are directed to compressing a Pattern Dependent Look-up Table (PDLUT) including distortion correction values corresponding to data symbol sequences, including: i) symmetrically rearranging the data symbol sequences and the associated distortion correction values; ii) folding and amplitude reversing a second half of the rearranged data symbol sequences and the associated distortion correction values; iii) determining approximate distortion correction values for a first half of the rearranged data symbol sequences based on the distortion correction values associated with the first half of the rearranged data symbol sequences and the folded and amplitude reversed distortion correction values associated with the second half of the data symbol sequences; and iv) updating the PDLUT based on the approximate distortion values corresponding to the first half of the rearranged data symbol sequences.

6 Claims, 35 Drawing Sheets

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| -7 | -7 | -7 | -7 | -7 | -7 | -7 | -7 | -7 | -7 | -7 | -7 | -7 | -7 | -7 | -7 |
| -7 | -5 | -3 | -1 | 1 | 3 | 5 | 7 | -7 | -5 | -3 | -1 | 1 | 3 | 5 | 7 |
| -7 | -7 | -7 | -7 | -7 | -7 | -7 | -7 | -5 | -5 | -5 | -5 | -5 | -5 | -5 | -5 |
| -1.17239 | -0.71254 | -0.30617 | -0.06961 | 0.171412 | 0.736053 | 1.072786 | 2.206714 | -0.83297 | -0.41078 | -0.10845 | 0.146491 | 0.395264 | 0.643187 | 1.191032 | 1.918138 |

. . .

| 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|
| -7 | -7 | -7 | -7 | -7 | -7 | -7 | -7 | -7 | -7 | -7 | -7 | -7 | -7 | -7 | -7 |
| -7 | -5 | -3 | -1 | 1 | 3 | 5 | 7 | -7 | -5 | -3 | -1 | 1 | 3 | 5 | 7 |
| 5 | 5 | 5 | 5 | 5 | 5 | 5 | 5 | 7 | 7 | 7 | 7 | 7 | 7 | 7 | 7 |
| -1.4252 | -0.89589 | -0.40878 | -0.18122 | -0.0009 | 0.248264 | 0.512677 | 1.095537 | -1.91086 | -1.18224 | -0.6444 | -0.16627 | 7.27E-05 | 0.377764 | 0.662859 | 1.288301 |

FIG. 9

| 65 | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|
| -5 | -5 | -5 | -5 | -5 | -5 | -5 | -5 | -5 | -5 | -5 | -5 | -5 | -5 | -5 | -5 |
| -7 | -5 | -3 | -1 | 1 | 3 | 5 | 7 | -7 | -5 | -3 | -1 | 1 | 3 | 5 | 7 |
| -7 | -7 | -7 | -7 | -7 | -7 | -7 | -7 | -5 | -5 | -5 | -5 | -5 | -5 | -5 | -5 |
| -1.22394 | -0.73408 | -0.59467 | -0.36177 | -0.08456 | 0.339132 | 0.866363 | 1.844614 | -0.63776 | -0.46286 | -0.25707 | 0.10665 | 0.030644 | 0.280294 | 0.859352 | 1.592119 |

· · ·

| 113 | 114 | 115 | 116 | 117 | 118 | 119 | 120 | 121 | 122 | 123 | 124 | 125 | 126 | 127 | 128 |
|---|---|---|---|---|---|---|---|---|---|---|---|---|---|---|---|
| -5 | -5 | -5 | -5 | -5 | -5 | -5 | -5 | -5 | -5 | -5 | -5 | -5 | -5 | -5 | -5 |
| -7 | -5 | -3 | -1 | 1 | 3 | 5 | 7 | -7 | -5 | -3 | -1 | 1 | 3 | 5 | 7 |
| 5 | 5 | 5 | 5 | 5 | 5 | 5 | 5 | 7 | 7 | 7 | 7 | 7 | 7 | 7 | 7 |
| -1.4615 | -0.65507 | -0.32213 | -0.12168 | -0.02679 | 0.091025 | 0.355229 | 0.719131 | -1.88781 | -0.97528 | -0.4449 | -0.11163 | 0.070396 | 0.260058 | 0.488179 | 0.933264 |

FIG. 10

| 1102 | 129 | 130 | 131 | 132 | 133 | 134 | 135 | 136 | 137 | 138 | 139 | 140 | 141 | 142 | 143 | 144 |
|---|---|---|---|---|---|---|---|---|---|---|---|---|---|---|---|---|
| 1104 | -3 | -3 | -3 | -3 | -3 | -3 | -3 | -3 | -3 | -3 | -3 | -3 | -3 | -3 | -3 | -3 |
|  | -7 | -5 | -3 | -1 | 1 | 3 | 5 | 7 | -7 | -5 | -3 | -1 | 1 | 3 | 5 | 7 |
|  | -7 | -7 | -7 | -7 | -7 | -7 | -7 | -7 | -5 | -5 | -5 | -5 | -5 | -5 | -5 | -5 |
| 1106 | -0.84115 | -0.76096 | -0.6051 | -0.39539 | -0.08456 | -0.01608 | 0.618848 | 1.700749 | -0.71213 | -0.39374 | -0.26081 | -0.22566 | -0.16498 | -0.00018 | 0.459954 | 1.21959 |

· · ·

| 1102 | 177 | 178 | 179 | 180 | 181 | 182 | 183 | 184 | 185 | 186 | 187 | 188 | 189 | 190 | 191 | 192 |
|---|---|---|---|---|---|---|---|---|---|---|---|---|---|---|---|---|
| 1104 | -3 | -3 | -3 | -3 | -3 | -3 | -3 | -3 | -3 | -3 | -3 | -3 | -3 | -3 | -3 | -3 |
|  | -7 | -5 | -3 | -1 | 1 | 3 | 5 | 7 | -7 | -5 | -3 | -1 | 1 | 3 | 5 | 7 |
|  | 5 | 5 | 5 | 5 | 5 | 5 | 5 | 5 | 7 | 7 | 7 | 7 | 7 | 7 | 7 | 7 |
| 1106 | -1.23262 | -0.6031 | -0.17801 | -0.03457 | -0.04508 | 0.021607 | 0.165285 | 0.492803 | -1.54461 | -0.81723 | -0.25588 | -0.065629 | 0.103978 | 0.238964 | 0.46539 | 0.839765 |

|  | Group 1 | Group 2 | Group 3 | Group 4 |
|---|---|---|---|---|
| Base Subset | 12 | 1 | 6 | 11 |
| scale Subset | 4 | 0 | 7 | 14 |
| a | 0.8511433 | 1.2105033 | 0.8400593 | 1.0211972 |
| b | -0.075676 | -0.204368 | -0.030283 | 0.0321379 |
| scale Subset | 8 | 2 | 9 | 15 |
| a | 0.8077597 | 0.844589 | 1.0916813 | 0.7057813 |
| b | -0.189006 | 0.0073529 | -0.169879 | -0.009268 |
| scale Subset |  | 3 | 10 |  |
| a |  | 0.7399695 | 0.7406947 |  |
| b |  | -0.016422 | -0.080606 |  |
| scale Subset |  | 5 | 13 |  |
| a |  | 0.8256738 | 0.9219141 |  |
| b |  | -0.141373 | -0.182062 |  |

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| -7 | -5 | -3 | -1 | 1 | 3 | 5 | 7 | -7 | -5 | -3 | -1 | 1 | 3 | 5 | 7 |
| -7 | -7 | -7 | -7 | -7 | -7 | -7 | -7 | -5 | -5 | -5 | -5 | -5 | -5 | -5 | -5 |
| -7 | -7 | -7 | -7 | -7 | -7 | -7 | -7 | -7 | -7 | -7 | -7 | -7 | -7 | -7 | -7 |
| 0.428431 | 0.480408 | 0.49227 | 0.156824 | -0.1503 | -0.60497 | -0.91023 | -1.5149 | 0.503589 | 0.622668 | 0.581762 | 0.456478 | 0.186323 | 0.031221 | -0.76025 | -0.71243 |

$\cdots$

| 497 | 498 | 499 | 500 | 501 | 502 | 503 | 504 | 505 | 506 | 507 | 508 | 509 | 510 | 511 | 512 |
|---|---|---|---|---|---|---|---|---|---|---|---|---|---|---|---|
| -7 | -5 | -3 | -1 | 1 | 3 | 5 | 7 | -7 | -5 | -3 | -1 | 1 | 3 | 5 | 7 |
| 5 | 5 | 5 | 5 | 5 | 5 | 5 | 5 | 7 | 7 | 7 | 7 | 7 | 7 | 7 | 7 |
| 7 | 7 | 7 | 7 | 7 | 7 | 7 | 7 | 7 | 7 | 7 | 7 | 7 | 7 | 7 | 7 |
| 0.846294 | 0.347599 | 0.006206 | -0.24009 | -0.49817 | -0.5723 | -0.57489 | -0.53547 | 1.009009 | 1.081908 | 0.619317 | 0.145773 | -0.15194 | -0.42376 | -0.55526 | -0.4455 |

| Path1 | Group1 | Group2 | Group3 | Group4 | Group5 |
|---|---|---|---|---|---|
| Base Subset | 2 | 4 | 15 | 14 | 25 |
| Scale Subset | 10 | 3 | 6 | 5 | 0 |
| a | 0.81586012 | 0.75365249 | 0.8799171 | 0.90291316 | 0.91722036 |
| b | 0.06987149 | -0.01865382 | -0.05608141 | 0.03053468 | -0.10664604 |
| Scale Subset | 11 | 12 | 7 | 22 | 1 |
| a | 0.87838746 | 0.73559243 | 1.07211967 | 0.75450642 | 0.81595347 |
| B | 0.00976955 | -0.02328933 | 0.0883624 | -0.06527326 | -0.08800051 |
| Scale Subset | 18 | 13 | 23 | 31 | 8 |
| a | 0.72999441 | 1.06468057 | 0.80125181 | 0.88732507 | 1.04491304 |
| B | 0.11817113 | -0.00331077 | -0.10970681 | -0.04657507 | -0.06635553 |
| Scale Subset | 19 | 21 | | | 9 |
| a | 0.66586388 | 0.78909846 | | | 0.77401436 |
| B | 0.02366907 | -0.07538964 | | | -0.00559213 |
| Scale Subset | 20 | 29 | | | 16 |
| a | 0.85283788 | 0.60110536 | | | 1.3160786 |
| B | -0.04318786 | -0.11543251 | | | -0.01087897 |
| Scale Subset | 27 | 30 | | | 17 |
| a | 0.64147503 | 0.94600924 | | | 0.80542424 |
| B | 0.05514156 | -0.06732463 | | | 0.00923298 |
| Scale Subset | 28 | | | | 24 |
| a | 0.70053102 | | | | 1.48646827 |
| b | -0.05355795 | | | | -0.12693377 |
| Scale Subset | | | | | 26 |
| a | | | | | 0.64847963 |
| b | | | | | 0.02719371 |

FIG. 27

| 64QAMCS | BER | LUT size |
|---|---|---|
| original | 0.04455 | |
| PDLUT3 | 0.025986 | 512 |
| PDLUT3_S | 0.026439 | 128 |
| PDLUT3_SU | 0.026953 | 56 |

| 64QAMCS | BER | LUT size |
|---|---|---|
| original | 0.04455 | |
| PDLUT+3 | 0.023906 | 1024 |
| PDLUT3+2 | 0.027265 | 576 |
| PDLUT2+3 | 0.023989 | 576 |
| PDLUT2+3_S | 0.024288 | 288 |
| PDLUT2+3_SU | 0.024666 | 126 |

METHOD AND SYSTEM FOR COMPRESSING AND EMPLOYING PATTERN DEPENDENT LOOK-UP TABLE

CROSS-REFERENCE TO RELATED APPLICATIONS

This is the first application filed for the instantly disclosed technology.

FIELD OF THE INVENTION

The present disclosure generally relates to the field of communication systems and, in particular, to methods and systems for compressing and employing a Pattern Dependent Look-up Table (PDLUT).

BACKGROUND

Generally, communication signals transmitted over wireless, wired, or optical networks are subject to various impairments such as non-linear distortions, especially at high baud speed (or high baud rate). The non-linear distortion includes pattern-dependent distortions with memory introduced by transmitter components such as digital-to-analog convertor (DAC), Radio Frequency (RF) amplifiers, and Mach-Zender modulators.

The non-linear distortions are caused by combined non-linear effects from the components of the transmitter, which interacts with the frequency responses of the individual components. The non-linear distortions degrade an amplitude and a phase that are based on a symbol sequence in a signal received by a receiver.

Such non-linear distortions have been recognized as one of the major impairments that limits the transceiver performance, especially for high-order modulation formats at high baud rates. The non-linear distortion typically exhibits a strong dependence on data patterns with a considerable memory length.

Generally, a lookup table (LUT) is generated by calculating distortion correction values corresponding to each symbol sequence in a present sequence of N symbols, and storing each calculated distortion correction value with an associated lookup table index. The distortion correction values are dependent upon the specific pattern of the symbol sequence, thus the resulting LUT is also referred to as a Pattern Dependent Lookup Table (PDLUT).

Pattern-dependent lookup table (PDLUT) is an efficient approach for mitigating pattern dependent distortion. The distortion correction values in the PDLUT are obtained based on a calibration process by comparing the data received by the receiver and the transmitted data at the transmitter. Pattern-dependent distortion can be mitigated based on the distortion correction. The PDLUT has achieved a good performance of compensating the transmitter non-linearity at a lower modulation format (for example, 16QAM), however, with higher modulation (for example, 64QAM) the PDLUT size increases exponentially. This results in complex hardware implementation of the non-linearity compensation system.

With this said, there is an interest in developing a compressed PDLUT that may reduce hardware complexity and improve power consumption of the non-linearity compensation system.

SUMMARY

The embodiments of the present disclosure have been developed based on developers' appreciation of the limitations associated with the prior art: namely, an increasing Pattern-dependent lookup table (PDLUT) size for a higher modulation index.

The developers have devised a system and a method of compressing a PDLUT including distortion correction values corresponding to data symbol sequences. More particularly, various embodiments of the present disclosure explore the symmetry and unification property of the PDLUT to compress the size of the PDLUT.

In accordance with a first broad aspect of the present disclosure, there is provided a method of compressing a Pattern Dependent Look-up Table (PDLUT) including distortion correction values corresponding to data symbol sequences, the method comprising: symmetrically rearranging the data symbol sequences and the associated distortion correction values; folding and amplitude reversing a second half of the rearranged data symbol sequences and the associated distortion correction values; determining approximate distortion correction values for a first half of the rearranged data symbol sequences based on the distortion correction values associated with the first half of the rearranged data symbol sequences and the folded and amplitude reversed distortion correction values associated with the second half of the data symbol sequences; and updating the PDLUT based on the approximate distortion values corresponding to the first half of the rearranged data symbol sequences.

In accordance with any embodiments of the present disclosure, the method further comprises: dividing the updated PDLUT into sub-PDLUTs; symmetrically rearranging the data symbol sequences and the approximate distortion correction values associated with the sub-PDLUTs; folding and amplitude reversing a second half of the rearranged data symbol sequences and the approximate distortion correction values associated with the sub-PDLUTs; determining updated approximate distortion correction values for a first half of the rearranged data symbol sequences associated with the sub-PDLUTs based on the approximate distortion correction values associated with the first half of the rearranged data symbol sequences and the folded and amplitude reversed approximate distortion correction values associated with the second half of the rearranged data symbol sequences associated with the sub-PDLUTs; and updating the PDLUT based on the updated approximate distortion values corresponding to the first half of the rearranged data symbol sequences associated with the sub-PDLUTs.

In accordance with any embodiments of the present disclosure, the method further comprises: segregating the approximate distortion values into subsets; identifying similarities between the subsets and clustering the subsets into groups based on the similarities; selecting base subsets from the groups, wherein the base subsets represent remaining subsets in the groups; generating a mapping table including mapping coefficients to map the base subsets to the remaining subsets in the groups; and updating the PDLUT with the base subsets and the mapping table In accordance with any embodiments of the present disclosure, identifying similarities and clustering the subsets is based on a principal component analysis (PCA) based artificial intelligence (AI) clustering technique.

In accordance with any embodiments of the present disclosure, the mapping coefficients are generated based on a linear regression technique.

In accordance with any embodiments of the present disclosure, the method further comprises providing the updated PDLUT to a receiver for pre-compensating under-correct symbols in the data symbol sequences.

In accordance with any embodiments of the present disclosure, the PDLUT is a cascaded PDLUT, and the cascaded PDLUT includes a first PDLUT and a second PDLUT.

In accordance with any embodiments of the present disclosure, determining approximate distortion correction values comprises one or more of: selecting one of the distortion correction values associated with the first half of the rearranged data symbol sequences or the folded and amplitude reversed distortion correction values associated with the second half of the data symbol sequences; averaging the distortion correction values associated with the first half of the rearranged data symbol sequences and the folded and amplitude reversed distortion correction values associated with the second half of the data symbol sequences; and adding a predetermined offset value to one of the distortion correction values associated with the first half of the rearranged data symbol sequences or the folded and amplitude reversed distortion correction values associated with the second half of the data symbol sequences.

In accordance with a second broad aspect of the present disclosure, there is provided a method for pre-compensating an under-correct symbol, the method comprising: based on a first data symbol sequence, selecting a base subset from a plurality of base subsets included in a compressed Pattern Dependent Look-up Table (PDLUT); in the event that the first data symbol sequence is included in the base subset, selecting an approximate distortion correction value corresponding to the first data symbol sequence from the base subset; in the event that the first data symbol sequence is not included in the base subset, extracting mapping coefficients from a mapping table included in the compressed PDLUT, based on the mapping coefficients, mapping the base subset to generate a desired subset, and selecting an approximate distortion correction value corresponding to the first data symbol sequence from the desired subset; and applying the approximate distortion correction value to the under-correct symbol In accordance with any embodiments of the present disclosure, the method further comprises: in the event that the first data symbol sequence is not included in the desired subset, determining a data symbol sequence in the desired subset, which is opposite to the first data symbol sequence, selecting an approximate distortion correction value corresponding to the opposite data symbol sequence from the desired subset, and negating the approximate distortion correction value corresponding to the opposite data symbol sequence.

In accordance with any embodiments of the present disclosure, the method further comprises: identifying a second data symbol sequence associated with the under-correct symbol in the PDLUT; in the event that the identified second data symbol sequence is included in the PDLUT, selecting an approximate distortion correction value corresponding to the identified second data symbol from the PDLUT; in the event that the identified second data symbol sequence is not included in the compressed PDLUT, determining a data symbol sequence in the compressed PDLUT which is opposite to the identified second data symbol sequence, selecting an approximate distortion correction value corresponding to the opposite data symbol sequence from the PDLUT, and negating the approximate distortion correction value corresponding to the opposite data symbol sequence; and applying the approximate distortion correction value to the under-correct symbol.

In accordance with a third broad aspect of the present disclosure, there is provided a system for compressing a Pattern Dependent Look-up Table (PDLUT) including distortion correction values corresponding to data symbol sequences, the system comprising: a non-transitory memory element having instructions thereon; a processor coupled to the non-transitory memory element and which execute the instructions to cause the processor to: symmetrically rearrange the data symbol sequences and the associated distortion correction values; fold and amplitude reverse a second half of the rearranged data symbol sequences and the associated distortion correction values; determine approximate distortion correction values for a first half of the rearranged data symbol sequences based on the distortion correction values associated with the first half of the rearranged data symbol sequences and the folded and amplitude reversed distortion correction values associated with the second half of the data symbol sequences; and update the PDLUT based on the approximate distortion values corresponding to the first half of the rearranged data symbol sequences.

In accordance with any embodiments of the present disclosure, the processor is further configured to: divide the updated PDLUT into sub-PDLUTs; symmetrically rearrange the data symbol sequences and the approximate distortion correction values associated with the sub-PDLUTs; fold and amplitude reverse a second half of the rearranged data symbol sequences and the associated approximate distortion correction values with the sub-PDLUTs; determine updated approximate distortion correction values for a first half of the rearranged data symbol sequences associated with the sub-PDLUTs based on the approximate distortion correction values associated with the first half of the rearranged data symbol sequences and the folded and amplitude reversed approximate distortion correction values associated with the second half of the rearranged data symbol sequences associated with the sub-PDLUTs; and update the PDLUT based on the updated approximate distortion values corresponding to the first half of the rearranged data symbol sequences associated with the sub-PDLUTs.

In accordance with any embodiments of the present disclosure, the processor is further configured to: segregate the approximate distortion values into subsets; identify similarities between the subsets and clustering the subsets into groups based on the similarities; select base subsets from the groups, wherein the base subsets represent remaining subsets in the groups; generate a mapping table including mapping coefficients to map the base subsets to the remaining subsets in the groups; and update the PDLUT with the base subsets and the mapping table.

In accordance with any embodiments of the present disclosure, the processor is further configured to provide the updated PDLUT to a receiver for pre-compensating under-correct symbols in the data symbol sequences.

In accordance with a fourth broad aspect of the present disclosure, there is provided a system for pre-compensating an under-correct symbol, the method comprising: a non-transitory memory element having instructions thereon; a processor coupled to the non-transitory memory element and which execute the instructions to cause the processor to: based on a first data symbol sequence, select a base subset from a plurality of base subsets included in a compressed Pattern Dependent Look-up Table (PDLUT); in the event that the first data symbol sequence is included in the base subset, select an approximate distortion correction value corresponding to the first data symbol sequence from the base subset; in the event that the first data symbol sequence is not included in the base subset, extract mapping coefficients from a mapping table included in the compressed PDLUT, based on the mapping coefficients, map the base subset to generate a desired subset, and select an approximate distortion correction value corresponding to the first data symbol sequence from the desired subset; and apply the approximate distortion correction value to the under-correct symbol.

In accordance with any embodiments of the present disclosure, the processor is further configured to: in the event that the first data symbol sequence is not included in the desired subset, determine a data symbol sequence in the desired subset, which is opposite to the first data symbol sequence, select an approximate distortion correction value corresponding to the opposite data symbol sequence from the desired subset, and negate the approximate distortion correction value corresponding to the opposite data symbol sequence.

In accordance with any embodiments of the present disclosure, the processor is further configured to: identify a second data symbol sequence associated with the under-correct symbol in the PDLUT; in the event that the identified second data symbol sequence is included in the PDLUT, select an approximate distortion correction value corresponding to the identified second data symbol from the PDLUT; in the event that the identified second data symbol sequence is not included in the compressed PDLUT, determine a data symbol sequence in the compressed PDLUT which is opposite to the identified second data symbol sequence, select an approximate distortion correction value corresponding to the opposite data symbol sequence from the PDLUT, negate the approximate distortion correction value corresponding to the opposite data symbol sequence; and apply the approximate distortion correction value to the under-correct symbol.

BRIEF DESCRIPTION OF THE FIGURES

The features and advantages of the present disclosure will become apparent from the following detailed description, taken in combination with the appended drawings, in which:

FIGS. 9-12 illustrate sub-PDLUTs, in accordance with various non-limiting embodiments of the present disclosure;

FIG. 19 illustrates a mapping table generated to map the subsets in a group to the corresponding base subset, in accordance with various non-limiting embodiments of the present disclosure;

FIG. 21 illustrates a representative rearranged PDLUT (with memory length 3), in accordance with various non-limiting embodiments;

FIG. 27 illustrates a mapping table generated to map the subsets in a group to the corresponding base subset, in accordance with various non-limiting embodiments of the present disclosure;

FIG. 30 illustrates a performance comparison table, in accordance with various non-limiting embodiments of the present disclosure;

FIG. 32 illustrates a performance comparison table corresponding to the cascaded PDLUT, in accordance with various non-limiting embodiments of the present disclosure;

Figure 1:
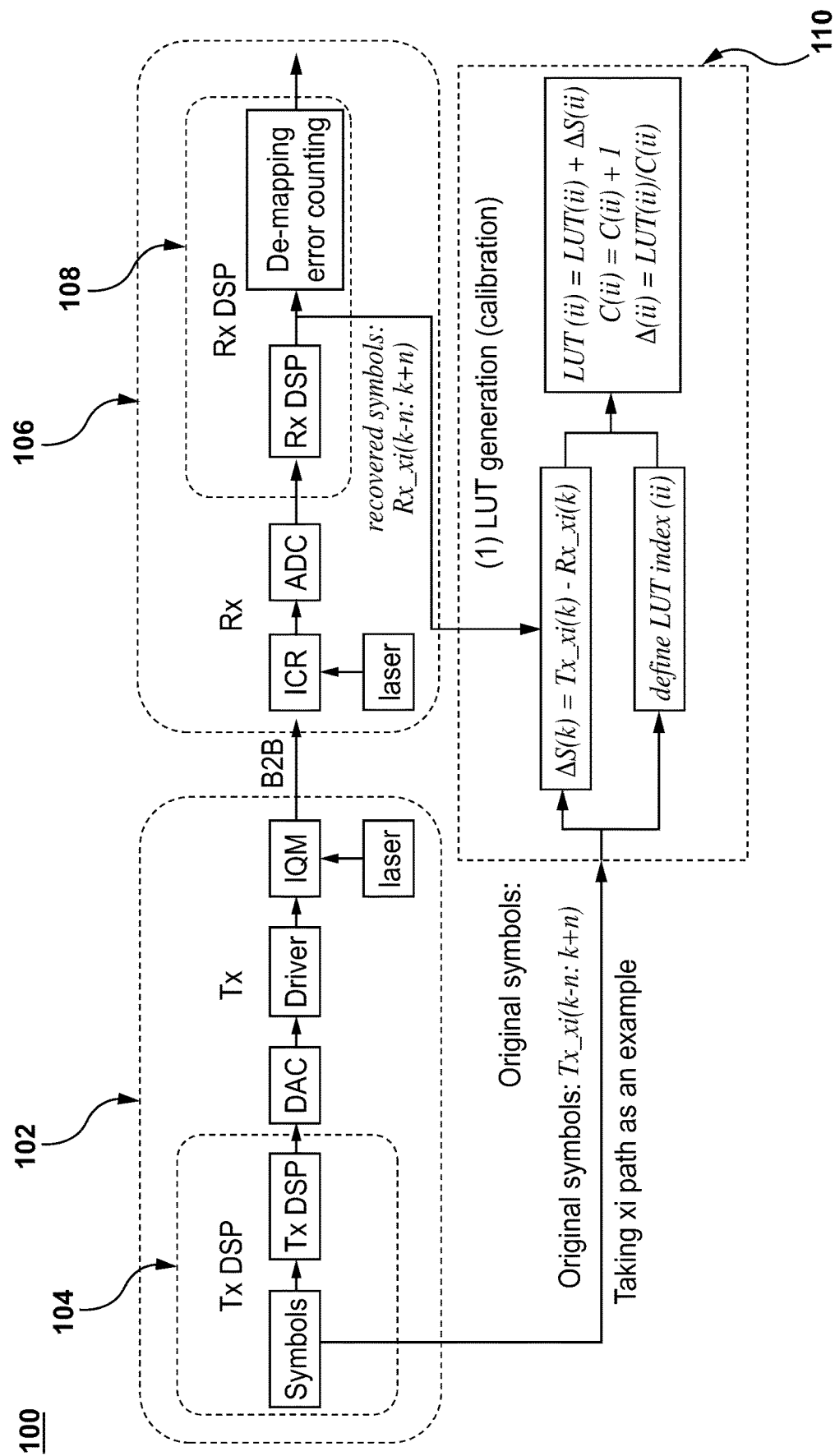
FIG. 1 (Prior Art) depicts a block diagram of conventional transceiver.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The instant disclosure is directed to addressing at least some of the deficiencies of the conventional techniques used to compress and employ Pattern Dependent Lookup Table (PDLUT) to compensate non-linearity in a communication system. In particular, the instant disclosure describes systems and methods to efficiently compressing and employing the PDLUT in the communication system.

Unless otherwise defined or indicated by context, all technical and scientific terms used herein have the same meaning as commonly understood by one of ordinary skill in the art to which the described embodiments appertain to.

In the context of the present specification, "controller" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

As used herein, the term "about" or "approximately" refers to a +/−15% variation from the nominal value. It is to be understood that such a variation is always included in a given value provided herein, whether or not it is specifically referred to.

With these fundamentals in place, the instant disclosure is directed to address at least some of the deficiencies of the current technology. In particular, the instant disclosure describes systems and methods to efficiently compressing and employing the PDLUT in the communication system.

Referring now to the drawings, FIG. 1 (Prior Art) depicts a block diagram of conventional transceiver 100. The transceiver 100 includes a transmitter 102 and a receiver 106. The transceiver 100 may be included in any type of communication system such as, for example, wired communication systems, wireless communication systems, and optical communication systems.

The transmitter 102 is a coherent transmitter and includes 4 independent data paths. Each data path is associated with the xi, xq, yi and yq data. The data paths propagate through the transmitter 102 before being modulated on laser output. The transmitter 102 includes a transmitter digital signal processor (DSP) 104 configured to process the data symbols and transmit over the communication channel. The receiver 106 includes a receiver DSP 108 configured to process and recover the transmitted data symbols.

It is contemplated that the conventional transceiver 100 includes components such as digital-to-analog convertor (DAC), Radio Frequency (RF) amplifiers, and Mach-Zender modulators, analog-to digital convertors (ADC) that may contribute to the non-linear distortions to the symbols propagating on different data paths. Generally, the non-linear distortions for different data paths are calibrated and compensated separately. For the purpose of simplicity, the xi, path has been taken as an example.

The conventional transceiver 100 further includes a look up table (LUT) generator 110 configured to generate a LUT for pre-compensation of the data symbols to mitigate or reduce the effect of non-linear distortions. The LUT table may include distortion correction values corresponding to each data symbol. Typically, the distortion correction values are dependent upon the specific pattern of the symbol sequence, thus the resulting LUT is also referred to as a Pattern Dependent Lookup Table (PDLUT).

The LUT generator 110 generates the PDLUT by comparing the ideal transmitted symbols Tx_xi with the received samples Rx_xi after linear compensation by the receiver DSP 108. The PDLUT contains the required amplitude correction $\Delta S$ for the center symbol within each possible symbol sequence Tx_xi (k−n: k+n) of length m=2n+1. By way of example, if the symbol sequence length is 5, $\Delta S$ corresponds to the third symbol in the symbol sequence.

A sliding window is used to identify the 2n+1 ideal symbol sequence to form the address of the table. The amplitude correction for the center symbol $\Delta S(k)$ is the difference between the symbol value Tx_xi (k) and the actual sample value Rx_xi(k) (i.e., $\Delta S(k)$=Tx_xi (k)−Rx_xi (k)). As the window moves forward, each time a specific symbol sequence appears, the amplitude correction is accumulated at the corresponding PDLUT entry. A PDLUT counter (C) is used to track the number of updates for each specific entry. The average correction is saved for the final PDLUT.

Figure 2:
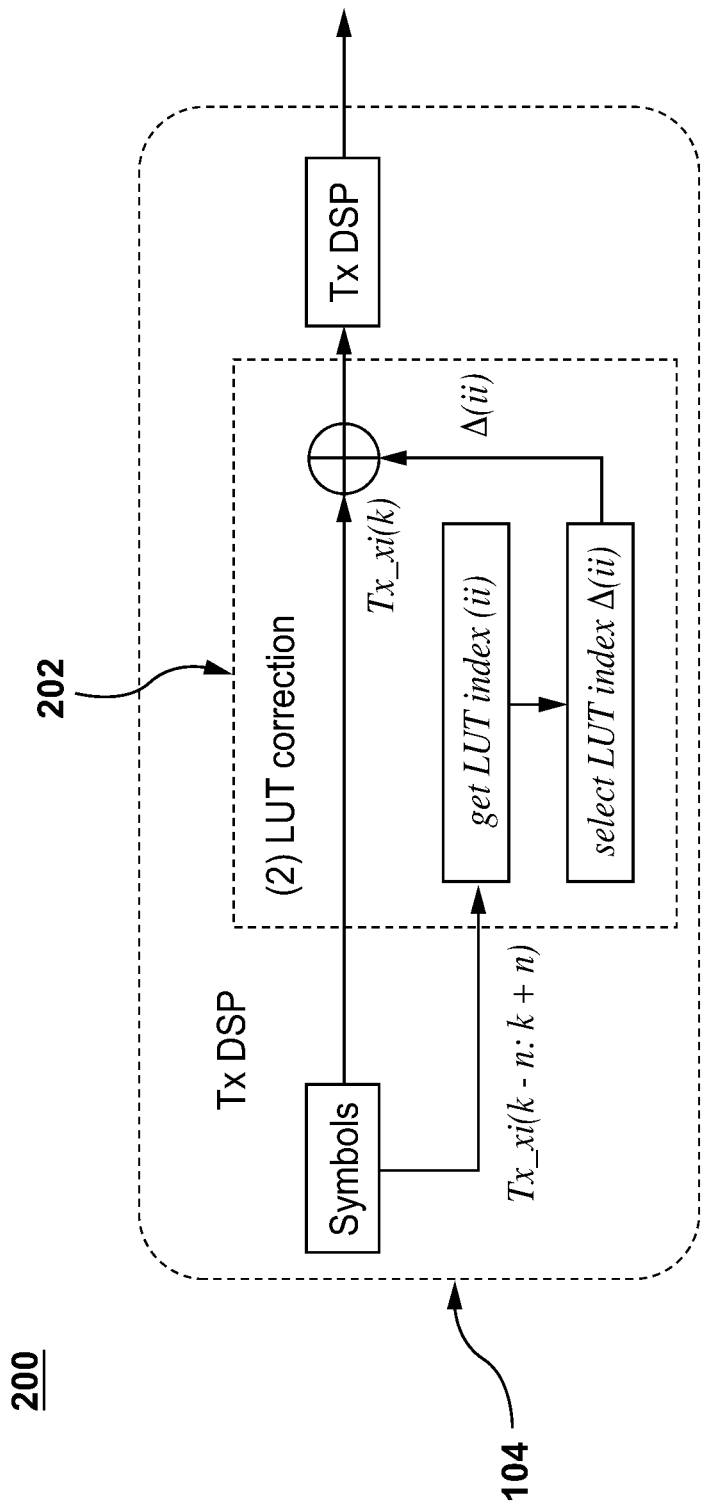
FIG. 2 (Prior Art) illustrates a conventional data symbol correction technique implemented over a transmitter digital signal processor (DSP)

Once the PDLUT is generated, the data symbol values may be corrected based on the distortion correction values. FIG. 2 (Prior Art) illustrates a conventional data symbol correction technique 200 implemented over the transmitter DSP 104. The transmitter 102 includes a data symbol corrector 202 configured to select the appropriate distortion correction values from the PDLUT and apply the distortion correction to the data symbols.

More particularly, the transmitter DSP 104 relies on the same sliding window as used by the LUT generator 110 to identify the 2n+1 ideal symbol sequence to get the address (ii). The distortion correction $\Delta(ii)$ in the specific address is applied to the center symbol of the 2n+1 ideal symbol sequence Tx_xi (k−n: k+n).

Even though, PDLUT has been illustrated a good performance of compensating the transmitter non-linearity, the PDLUT size increases exponentially with modulation formats. With a memory length of m, PDLUT size of 16QAM is $4^m$, while for 64QAM, the size is increased to $8^m$. PDLUT is quite large to be implemented for 64QAM and higher modulation format, thereby increases the hardware complexity and the associated power consumption.

Figure 3:
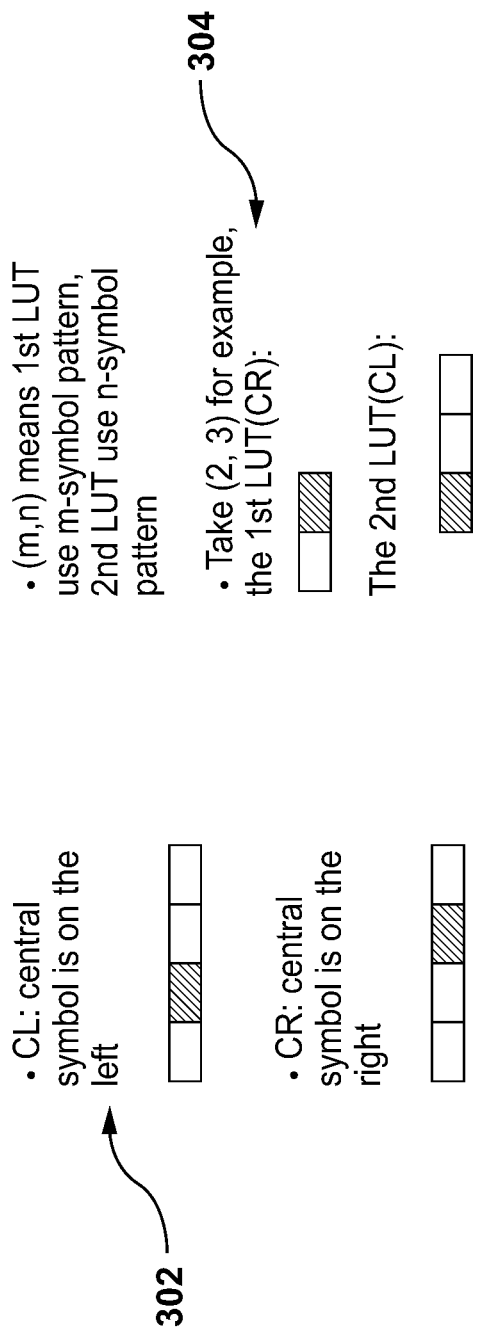
FIG. 3 (Prior Art) illustrates a conventional pattern-dependent lookup table (PDLUT) method and a cascaded-PDLUT method.

Conventionally, to reduce a size of the PDLUT, a cascaded-PDLUT method is employed. In the cascaded-PDLUT method two small LUTs replace one large LUT. The under-correct symbol is not in the middle, but at the left (CL) or right (CR) end. FIG. 3 (Prior Art) illustrates a conventional PDLUT method 302 and a cascaded-PDLUT method 304. It is to be noted that a memory length of the conventional PDLUT may be odd or even. In the event that the memory length is odd, the symbol in the center is treated as under-correct symbol that needs correction, In the event that the memory length is even, the under-correct symbol could be in the center left (CL) or center right (CR). The performance of 'CR' and 'CL' could be different because of the non-linear asymmetry, and the one with a better performance is selected. In the cascaded-PDLUT method 304, the under-correct symbol could be at the extreme right or at the extreme left of the data symbol sequence.

Figure 4:
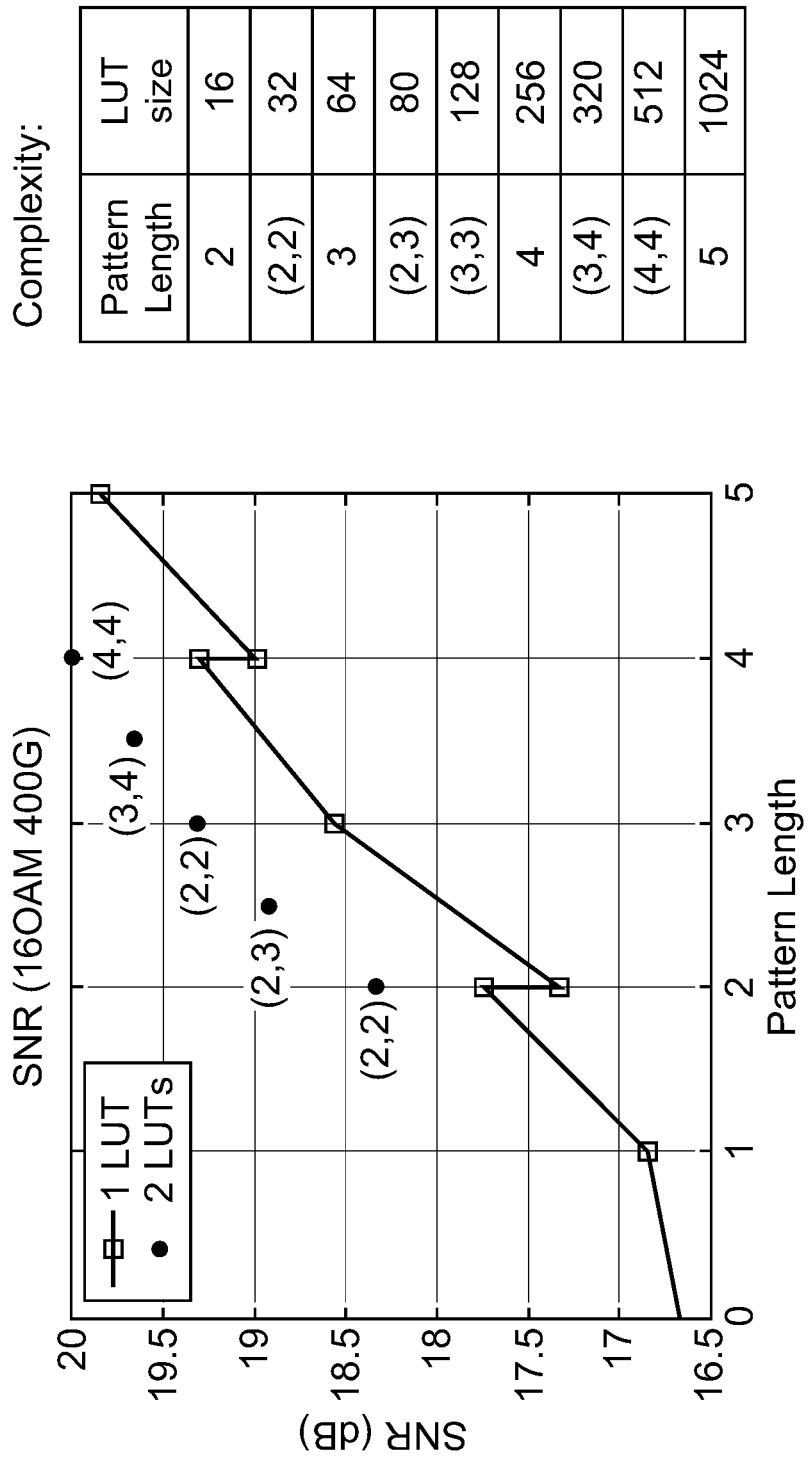
FIG. 4 (Prior Art) illustrates a signal-to-noise ratio (SNR) based performance comparison of 16QAM based modulation format.

FIG. 4 (Prior Art) illustrates a signal-to-noise ratio (SNR) based performance comparison of 16QAM based modulation format. Conventional PDLUT with memory of 4 (also referred to as PDLUT4) and under-correct symbol on the central left (CL) shows a good performance with a considerable complexity. Cascaded PDLUT (3, 3) (also referred to as PDLUT 3+3) has the same performance as that of PDLUT4, but the LUT size is reduced to half. Therefore, considering the trade-off between LUT size and performance, PDLUT3+3 is preferred for 16QAM. Even though, the longer memory length (for example, with length 4, 4) illustrates a better performance, however, the hardware complexity increases with the increase in the size of PDLUT. For example, for 64QAM, the PDLUT size of PDLUT3+3 is increased from 128 to 1024, which is still too large to be implemented.

With this said, there is an interest in developing systems and methods for developing low complexity based PDLUT.

Figure 5:
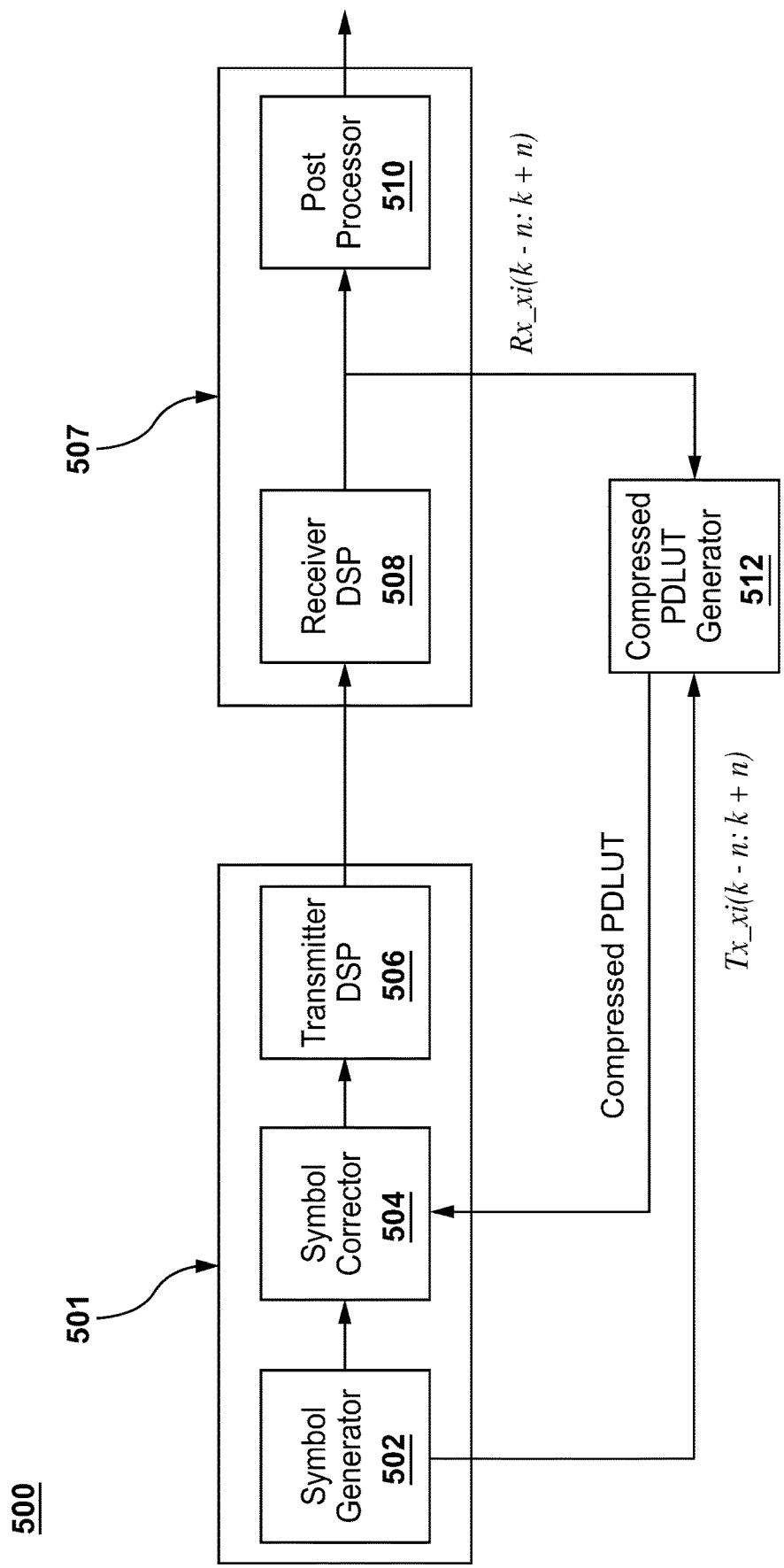
FIG. 5 illustrates a transceiver configured to pre-compensate the data symbols based on compressed PDLUT, in accordance with various non-limiting embodiments of the present disclosure.

FIG. 5 illustrates a transceiver 500 configured to pre-compensate the data symbols based on compressed PDLUT, in accordance with various non-limiting embodiments of the present disclosure. As shown, the transceiver 500 may include a symbol generator 502, a symbol corrector 504, a transmitter DSP 506 on the transmitter side 501 and may include a receiver DSP 508 and a post processor 510 on the receiver side 507. In addition, the transceiver 500 may include a compressed PDLUT generator 512. It is to be noted that a location of the compressed PDLUT generator 512 should not limit the scope of present disclosure. In some embodiments, the compressed PDLUT generator may be located in close vicinity either to the transmitter side 501 or receiver side 507. In other embodiments, the compressed PDLUT generator may be located at a distant location from the transmitter side 501 and the receiver side 507. Also, the communication medium between the transmitter side 501, the receiver side 507, and the compressed PDLUT generator 512 may any suitable medium such as, for example, a wired medium, a wireless medium, optical medium or the like.

The compressed PDLUT generator 512 may generate the initial PDLUT in a conventional manner as previously noted. The compressed PDLUT generator 512 may explore the symmetry property and unification property of the initial PDLUT for compression purposes. Even though, the initial PDLUT may be based on any suitable modulation format for example, PAM4, PAM8, 16QAM, 16QAMCS, 64QAM, 64QAMCS or higher modulation format and of any suitable memory length, such as 3, 4, 5, or 6, for the purpose of simplicity, 64QAM with a memory length of 3 is assumed.

Each value in the initial PDLUT may be corresponding to a data symbol sequence of length 3 (also referred to a sequence of memory length 3). The middle data symbol in the sequence may the under-correct symbol, and the other two symbols may be the left and right symbols adjacent to the under-correct symbol. Since the modulation format assumed is 64QAM and the memory length is 3, the initial PDLUT may include a total of $8^3=512$ distortion correction values. The compressed PDLUT generator 512 may rearrange the data symbol sequences and the associated distortion correction values in a manner that the data symbol sequences are symmetrical. By way of example, symbol values in the first symbol data sequence in the rearranged PDLUT may be negative of the symbol values in the last symbol data sequence in the rearranged PDLUT. Similarly, symbol values in the second symbol data sequence in the rearranged PDLUT may be negative of the symbol values in the second last symbol data sequence in the rearranged PDLUT.

Figure 6:
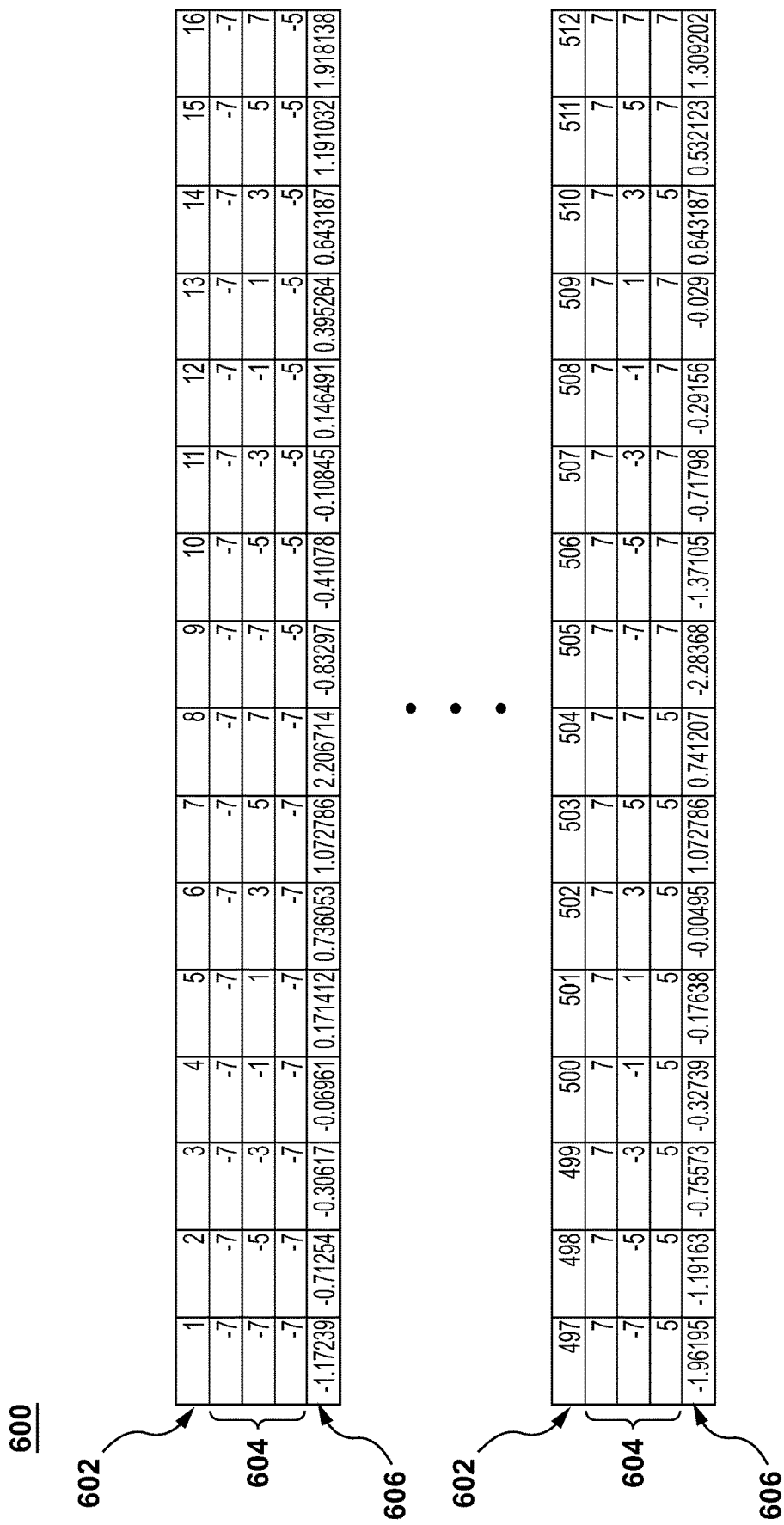
FIG. 6 illustrates a representative rearranged PDLUT in accordance with various non-limiting embodiments.

FIG. 6 illustrates a representative rearranged PDLUT 600 in accordance with various non-limiting embodiments. The rearranged PDLUT 600 may include an index 602, data symbol sequences 604, and associated distortion correction values 606. The data symbols may be any one of [−7, −5, −3, −1, 1, 3, 5, 7]. The data symbol sequences 604 may be arranged as follows: i) First, the left symbol is fixed at −7, the right symbol is fixed at −7, and the center symbol varies from −7 to 7; and ii) The right symbol is changed from −7 to −5, and the center symbol varies from −7 to 7, and so on.

Figure 7:
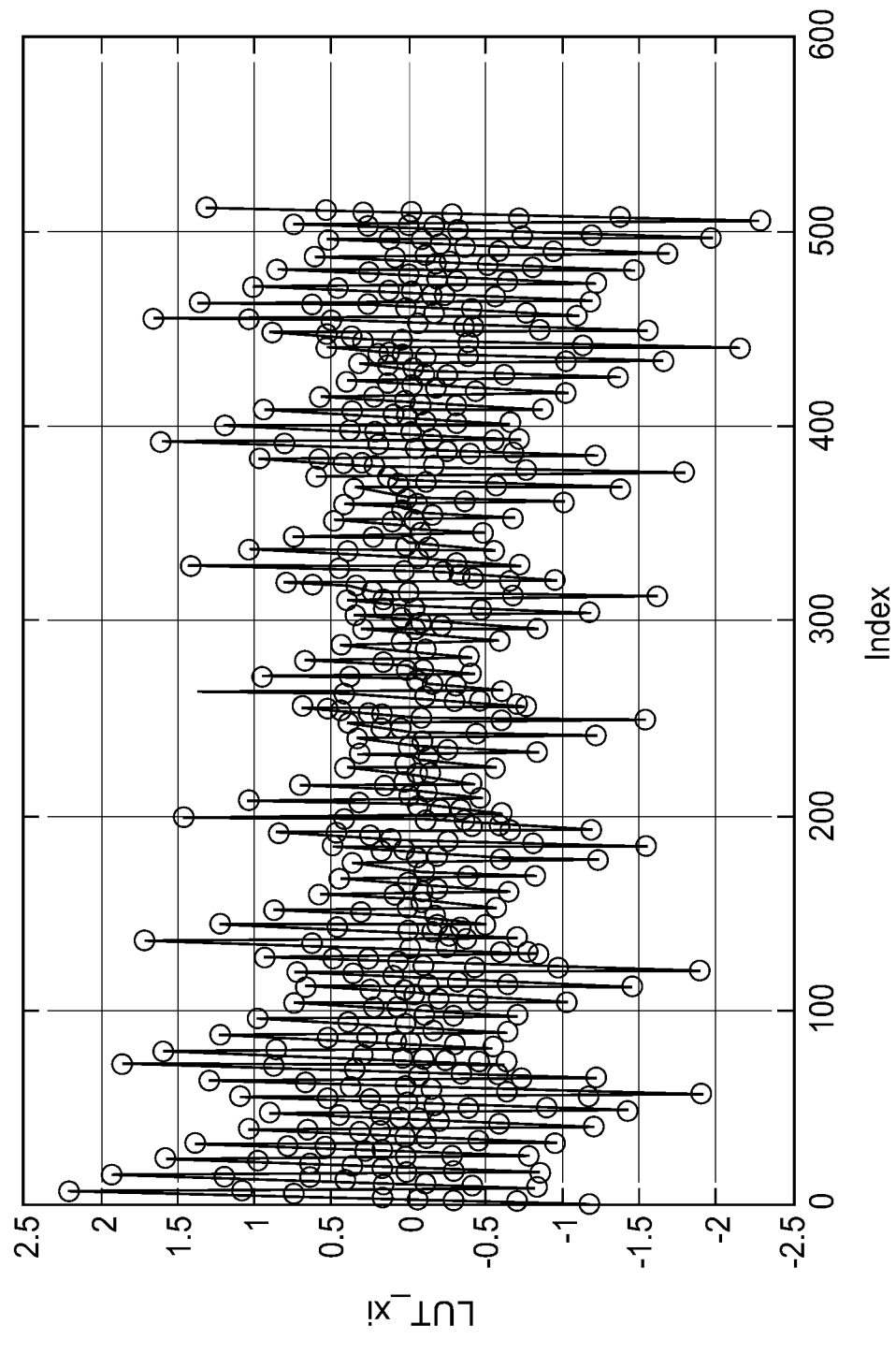
FIG. 7 illustrates a representation of the distortion correction values plotted against the index, in accordance with various embodiments of the present disclosure.

FIG. 7 illustrates a representation 700 of the distortion correction values 606 plotted against the index 602, in accordance with various embodiments of the present disclosure. As shown, the distortion correction values 606 are approximately symmetrical about the center point of the index 602. In other words, the distortion correction values 606 may be symmetrical about the index value 256. The distortion correction values 606 are approximately symmetrical as the sequences are opposite about the center point. For example, the first data symbol sequence is [−7 −7 −7] and the last data symbol sequence [7 7 7] is opposite to the first data symbol sequence, therefore the distortion may be approximately equal and opposite to each other.

To compress or reduce the size of the rearranged PDLUT 600, in certain embodiments, the compressed PDLUT generator 512 may be configured to fold, and amplitude reverse the second half of the rearranged data symbol sequences and the associated distortion correction values in the rearranged PDLUT 600. The process of amplitude reversal may be achieved by multiplying the second half of the rearranged data symbol sequences and the associated distortion correction values by −1. In so doing, the distortion correction value associated with the last data symbol sequence may be overlapped with the distortion correction value associated with the first data symbol sequence. The distortion correction value associated with the second last data symbol sequence may be overlapped with the distortion correction value associated with the second data symbol sequence and so on.

Figure 8:
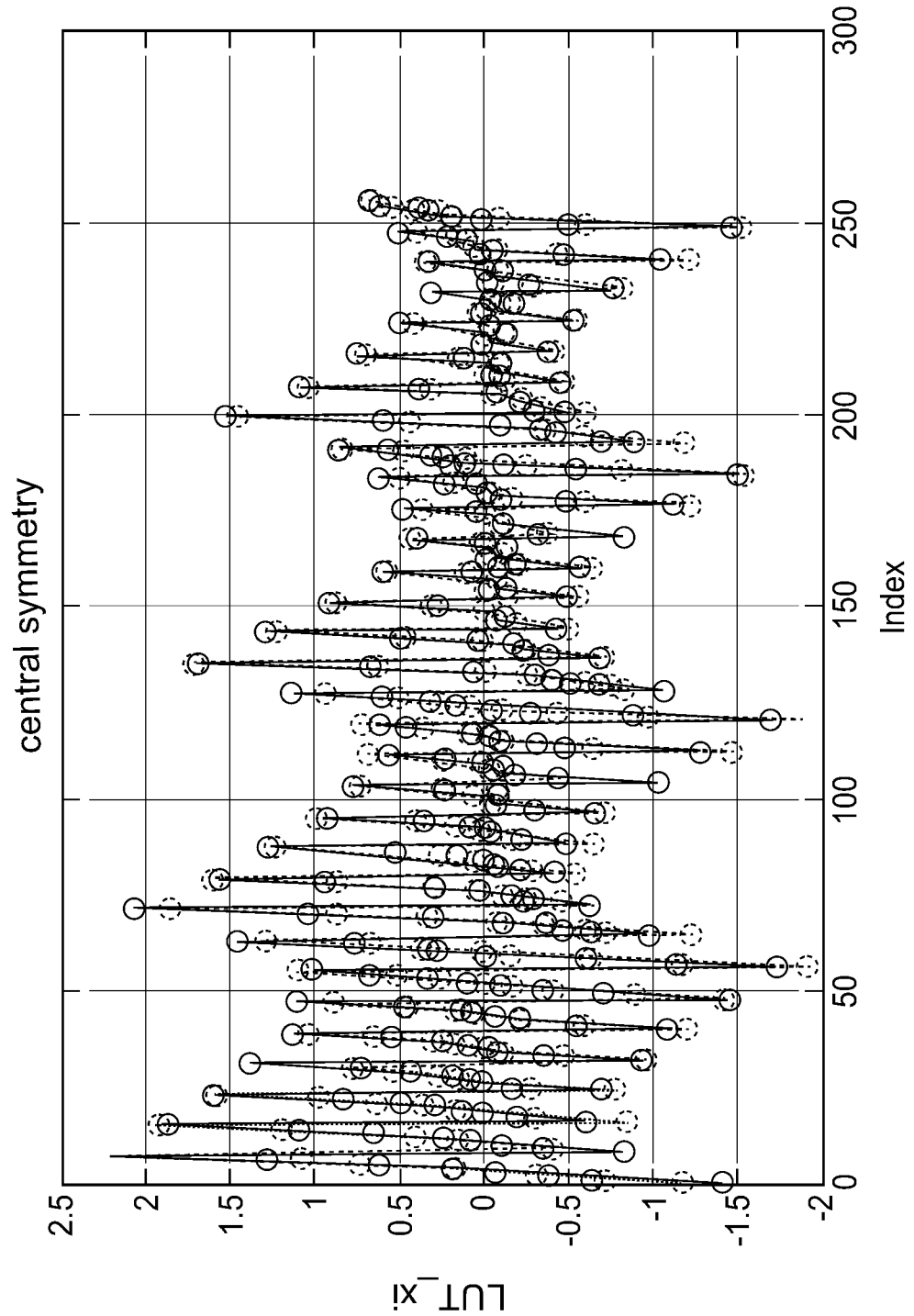
FIG. 8 illustrates a representation of a folded PDLUT, in accordance with various non-limiting embodiments of the present disclosure.
Figure 12:
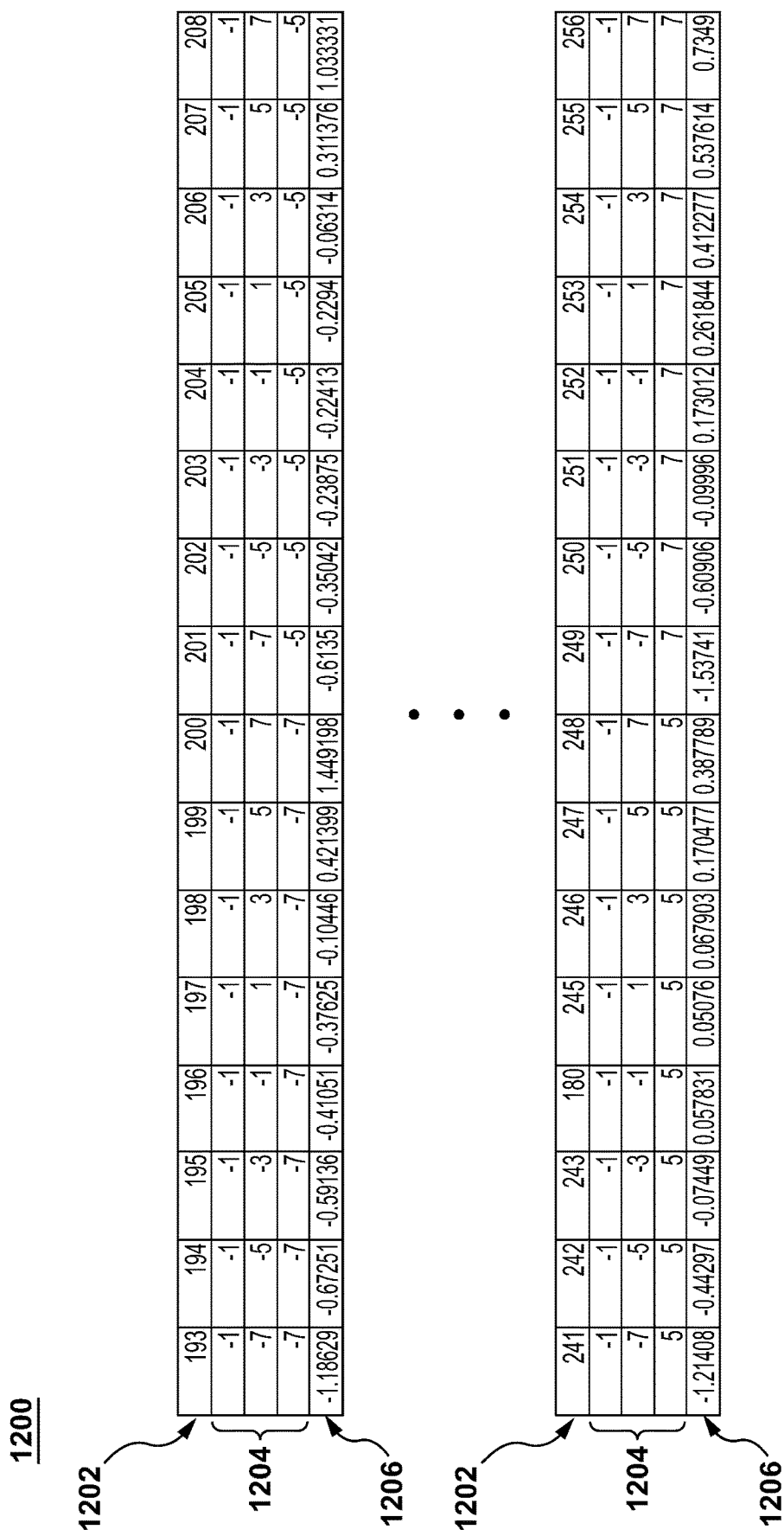

FIG. 8 illustrates a representation 800 of a folded PDLUT, in accordance with various non-limiting embodiments of the present disclosure. It is to be noted that the two overlapped distortion correction values may be approximately same. The compressed PDLUT generator 512 may determine an approximate distortion correction from the two overlapped distortion correction values. In some embodiments, the compressed PDLUT generator 512 may take an average of the two overlapped distortion correction values. In other embodiments, the compressed PDLUT generator 512 may select any one of the two overlapped distortion correction values. In order to determine an approximate distortion correction value corresponding to the first data symbol sequence is [−7 −7 −7], the compressed PDLUT generator 512 may either take an average of the reversed distortion correction value −1.309202 corresponding to the symbol sequence of [7 7 7] and the distortion correction value −1.17239 or select one of the distortion correction value −1.309202 and the distortion correction value −1.17239.

In yet other embodiments, the compressed PDLUT generator 512 may add an offset value to the distortion correction values to obtain the approximate distortion correction values. The compressed PDLUT generator 512 may determine a value of the offset, for example, by blind searching, and the determined offset value may be the one that may correspond to a smallest RMS value of the errors between the distortion correction values of the first half of the rearranged data symbol sequences and reversed values of the second half of the rearranged data symbol sequences.

By way of example, based on the blind searching technique, the compressed PDLUT generator 512 may determine that a representative value of the offset is 0.13. In order to determine an approximate distortion correction value corresponding to first data symbol sequence [−7 −7 −7], the compressed PDLUT generator 512 may multiply the distortion correction value 1.309202 associated with the last data symbol sequence [7 7 7] by −1 and subtract the representative offset 0.13 to determine the approximate distortion correction value. Similarly, to determine an approximate distortion correction value corresponding to second data symbol sequence [−7 −5 −7], the compressed PDLUT generator 512 may multiply the distortion correction value 0.532123 associated with the second last data symbol sequence [7 5 7] by −1 and subtract the representative offset 0.13 to determine the approximate distortion correction value and so on.

In yet other embodiments, where the compressed PDLUT generator 512 determines the approximate distortion correction values by taking an average of the two overlapped distortion correction values, the compressed PDLUT generator 512 may still add an offset value to the averaged distortion correction value. Similar to the previous embodiments, the compressed PDLUT generator 512 may determine a value of the offset, for example, by blind searching, and the determined offset value may be the one that may correspond to a smallest RMS value of the errors between the distortion correction values of the first half of the rearranged data symbol sequences and reversed values of the second half of the rearranged data symbol sequences.

By way of example, based on the blind searching technique, the compressed PDLUT generator 512 may determine that a representative value of the offset corresponding to the averaging technique is 0.065. In order to determine an approximate distortion correction value corresponding to first data symbol sequence [−7 −7 −7], the compressed PDLUT generator 512 may multiply the distortion correction value 1.309202 associated with the last data symbol sequence [7 7 7] by −1, take an average of the distortion correction value −1.17239 associated with the first data symbol sequence [−7 −7 −7] and the reversed distortion correction value −1.309202 corresponding to the last data symbol sequence [7 7 7], and add the representative offset 0.065 to determine the approximate distortion correction value. Similarly, to determine an approximate distortion correction value corresponding to second data symbol sequence [−7 −5 −7], the compressed PDLUT generator 512 may multiply the distortion correction value 0.532123 associated with the second last data symbol sequence [7 5 7] by −1, take an average of the distortion correction value −0.71254 associated with the second data symbol sequence [−7 −5 −7] and the reversed distortion correction value −0.532123 corresponding to the second last data symbol sequence [7 5 7], and add the representative offset 0.065 to determine the approximate distortion correction value and so on.

How the compressed PDLUT generator 512 determines the approximate distortion correction value should not limit the scope of present disclosure. Also, in the above embodiments, it was assumed that second half of the rearranged PDLUT 600 was folded, and amplitude reversed over the first half of the rearranged PDLUT 600. In various embodiments, the first half of the rearranged PDLUT 600 may be folded, and amplitude reversed over the second half of the rearranged PDLUT 600.

The compressed PDLUT generator 512 may reduce the size of the PDLUT from 512 to and generate a compressed PDLUT having 256 indexes. In certain non-limiting embodiments, to further reduce the size of the compressed PDLUT having 256 indexes, the compressed PDLUT generator 512 may divide the compressed PDLUT having 256 indexes into four sub-PDLUTs, each including 64 indexes, 64 data symbol patterns and 64 distortion correction value.

FIGS. 9-12 illustrate sub-PDLUTs, in accordance with various non-limiting embodiments of the present disclosure. The first sub-PDLUT 900 may include an index 902, data symbol sequences 904, and associated distortion correction values 906. The index 902 in the first sub-PDLUT 900 is from 1 to 64. The left symbols in the data symbol sequences 904 are fixed to −7, the right symbol is fixed at −7, and the center symbol varies from −7 to 7. After that the right symbol is changed from −7 to −5, and the center symbol varies from −7 to 7, and so on. Since the center symbols and the right symbols are symmetrical and opposite to each other about the center point, the corresponding distortion correction values 906 are approximately same (with some offset) and opposite to each other about the center point. By way of example, the center and the right symbols [−7 −7] in the first data symbol sequence are opposite to the center and the right symbols [7 7] in the last data symbol sequence and the left symbols in the first data symbol sequence and the last data symbol sequence are the same. Therefore, the distortion may be approximately equal and opposite to each other.

The second sub-PDLUT 1000 may include an index 1002, data symbol sequences 1004, and associated distortion correction values 1006. The index 1002 in the second sub-PDLUT 1000 is from 65 to 128. The left symbols in the data symbol sequences 1004 are fixed to −5, the right symbol is fixed at −7, and the center symbol varies from −7 to 7. After that the right symbol is changed from −7 to −5, and the center symbol varies from −7 to 7, and so on. Similar to the first sub-PDLUT 900, the center symbols and the right symbols in the second sub-PDLUT 1000 are symmetrical and opposite to each other about the center point, the corresponding distortion correction values 1006 are approximately same (with some offset) and opposite to each other about the center point.

The third sub-PDLUT 1100 may include an index 1102, data symbol sequences 1104, and associated distortion correction values 1106. The index 1102 in the third sub-PDLUT 1100 is from 129 to 192. The left symbols in the data symbol sequences 1104 are fixed to −3, the right symbol is fixed at −7, and the center symbol varies from −7 to 7. After that the right symbol is changed from −7 to −5, and the center symbol varies from −7 to 7, and so on. Similar to the first sub-PDLUT 900 and the second sub-PDLUT 1000, the center symbols and the right symbols in the third sub-PDLUT 1100 are symmetrical and opposite to each other about the center point, the corresponding distortion correction values 1106 are approximately same (with some offset) and opposite to each other about the center point.

The fourth sub-PDLUT 1200 may include an index 1202, data symbol sequences 1204, and associated distortion correction values 1206. The index 1202 in the fourth sub-PDLUT 1200 is from 193 to 256. The left symbols in the data symbol sequences 1204 are fixed to −1, the right symbol is fixed at −7, and the center symbol varies from −7 to 7. After that the right symbol is changed from −7 to −5, and the center symbol varies from −7 to 7, and so on. Similar to the first sub-PDLUT 900, the second sub-PDLUT 1000 and the third sub-PDLUT 1100, the center symbols and the right symbols in the third sub-PDLUT 1200 are symmetrical and opposite to each other about the center point, the corresponding distortion correction values 1106 are approximately same (with some offset) and opposite to each other about the center point.

Figure 13:
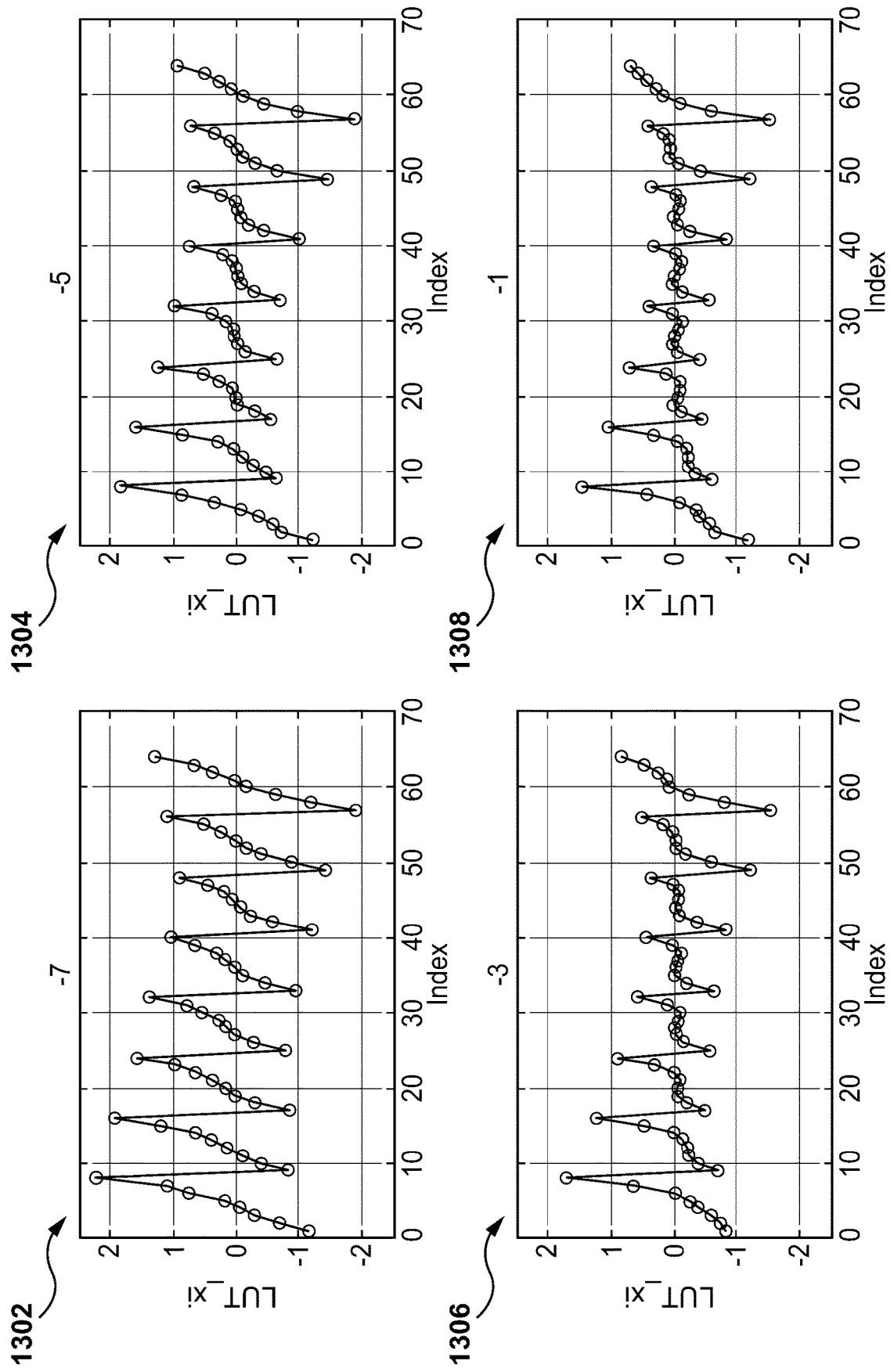
FIG. 13 illustrates representations of the distortion correction values associated with the sub-PDLUTs respectively plotted against the corresponding indexes, in accordance with various embodiments of the present disclosure.

FIG. 13 illustrates representations 1302-1308 of the distortion correction values associated with the sub-PDLUTs 900, 1000, 1100, and 1200 respectively plotted against the corresponding indexes, in accordance with various embodiments of the present disclosure. As shown, the distortion correction values are approximately symmetrical about the center point of the indexes. For the sub-PDLUTs 900, 1000, 1100, and 1200, the distortion correction values may be symmetrical about the index value 32, 96, 160, and 224 respectively.

To further compress or reduce the size of the sub-PDLUTs 900, 1000, 1100, and 1200, in certain embodiments, the compressed PDLUT generator 512 may be configured to fold the sub-PDLUTs 900, 1000, 1100, and 1200 around the respective center points and multiply the folded distortion correction values by −1. In so doing, the distortion correction value associated with the last data symbol sequence in each of the sub-PDLUTs 900, 1000, 1100, and 1200 may be overlapped with the distortion correction value associated with the first data symbol sequence of each of the sub-PDLUTs 900, 1000, 1100, and 1200. The distortion correction value associated with the second last data symbol sequence in each of the sub-PDLUTs 900, 1000, 1100, and 1200 may be overlapped with the distortion correction value associated with the second data symbol sequence of each of the sub-PDLUTs 900, 1000, 1100, and 1200. and so on.

Figure 14:
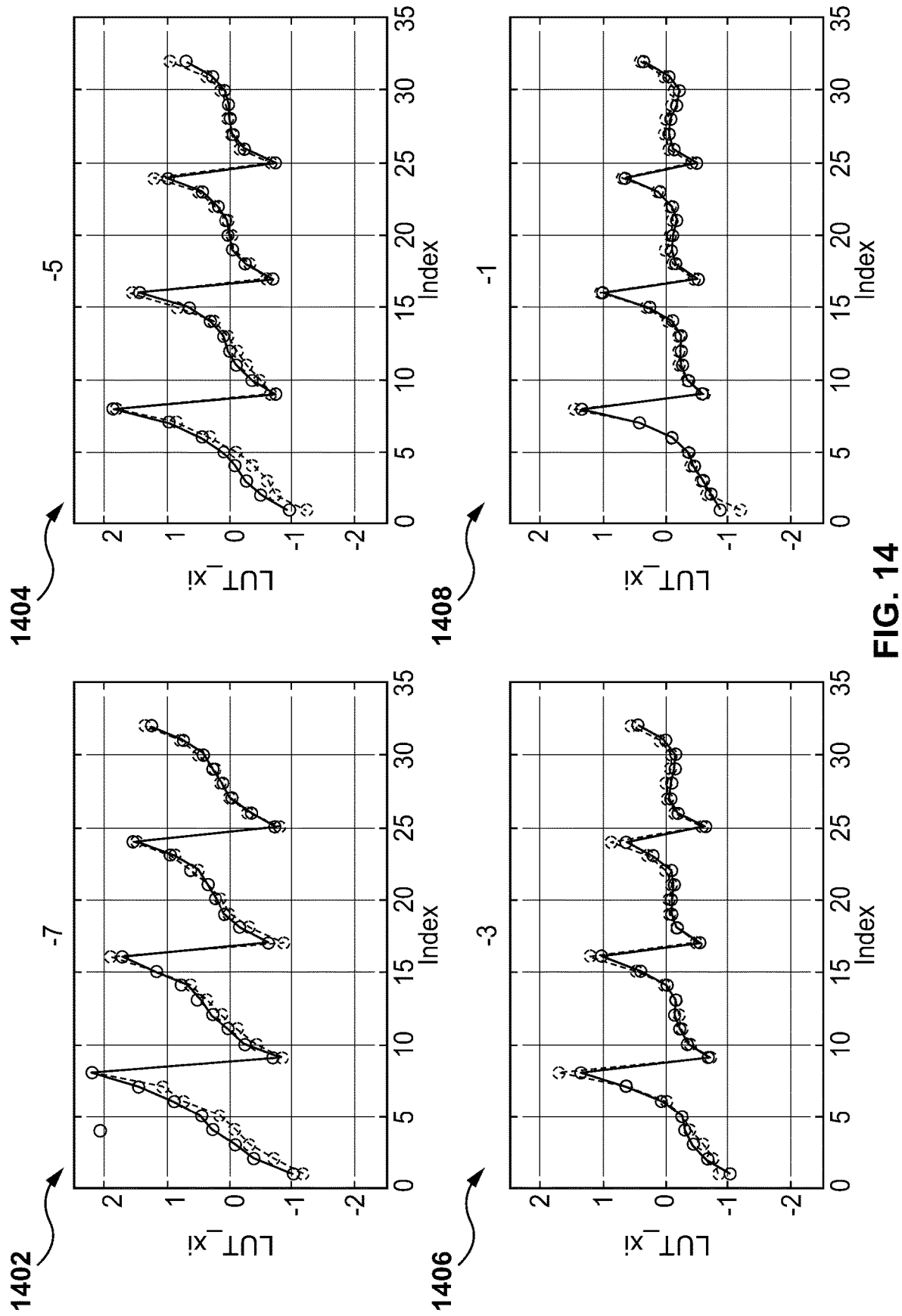
FIG. 14 illustrates representations of the folded sub-PDLUTs, in accordance with various non-limiting embodiments of the present disclosure.

FIG. 14 illustrates representations 1402-1408 of the folded sub-PDLUTs 900, 1000, 1100, and 1200, in accordance with various non-limiting embodiments of the present disclosure. As previously discussed, the two overlapped distortion correction values may be approximately same with some offset. The compressed PDLUT generator 512 may determine an approximate distortion correction from the two overlapped distortion correction values in a similar manner as discussed above.

Further, the compressed PDLUT generator 512 may combine the approximate distortion correction values corresponding to the folded sub-PDLUTs 900, 1000, 1100, and 1200 to generate a simplified PDLUT such that the size of the simplified PDLUT may be reduced to ¼ of the original.

Figure 15:
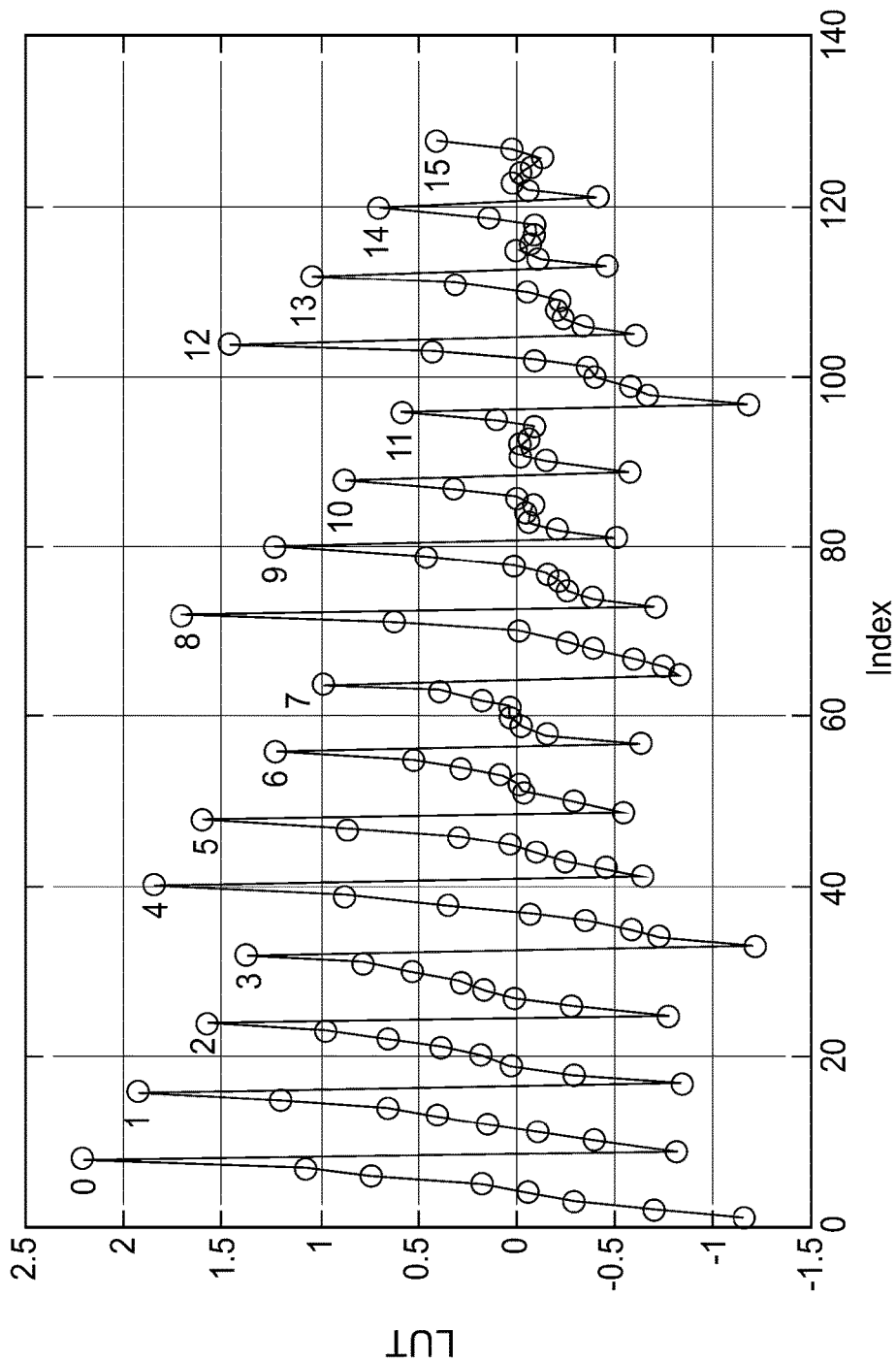
FIG. 15 illustrates a representation of the approximate distortion correction values corresponding to the simplified PDLUT, in accordance with various non-limiting embodiments.

FIG. 15 illustrates a representation 1500 of the approximate distortion correction values corresponding to the simplified PDLUT, in accordance with various non-limiting embodiments. The compressed PDLUT generator 512 may segregate the approximate distortion correction values in the representation 1500 into subsets represented as 0, 1, 2 . . . 15 in FIG. 15. Each subset may include 8 approximate distortion correction values corresponding to the under-correct symbol varying from −7 to 7. It may be observed from the representation 1500 that at least some of the subsets may be similar to each other, and therefore the subsets may be classified into several groups based on the respective similarity. For each group, one subset may be selected as a base subset while the other subsets may be represented in terms of the base subset. In other words, the compressed PDLUT generator 512 may further reduce a size of the simplified PDLUT by exploring the unification property of the approximate distortion correction values.

Figure 16:
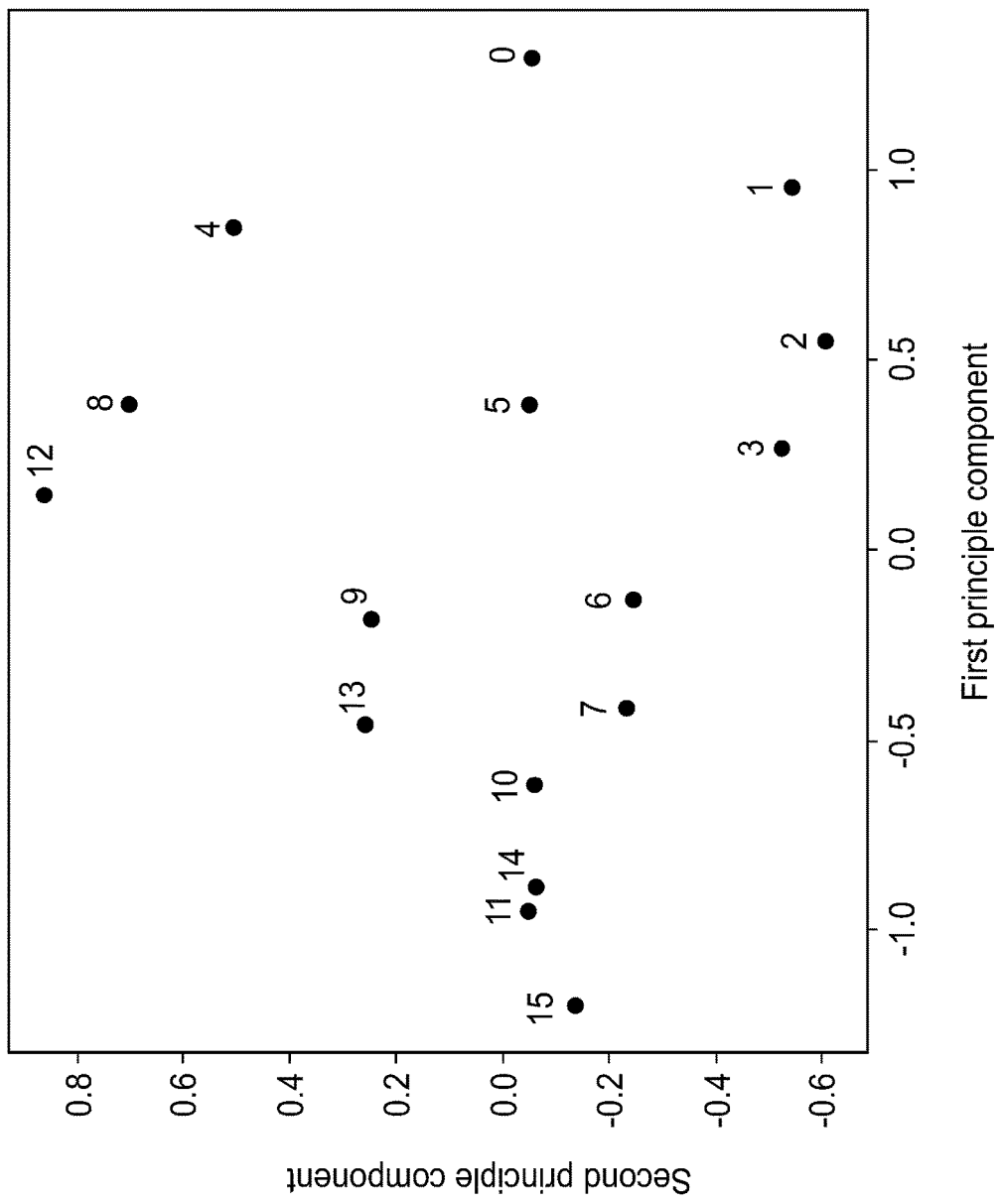
FIG. 16 illustrates compressed features corresponding to the 16 subsets, in accordance with various non-liming embodiments of the present disclosure.

In certain non-limiting embodiments, the unification process may be realized by artificial intelligence (AI) clustering technique. As noted above, each subset may include 8 approximate distortion correction values and for AI clustering, each approximate distortion correction value may represent a feature. The compressed PDLUT generator 512 may rely on principal component analysis (PCA) based AI clustering technique for reducing the dimensionality of the subsets, increasing interpretability and at the same time minimizing the information loss in the subsets. By using the PCA technique may reduce the features from 8 to 2 in each subset. FIG. 16 illustrates compressed features 1600 corresponding to the 16 subsets, in accordance with various non-liming embodiments of the present disclosure.

Figure 17:
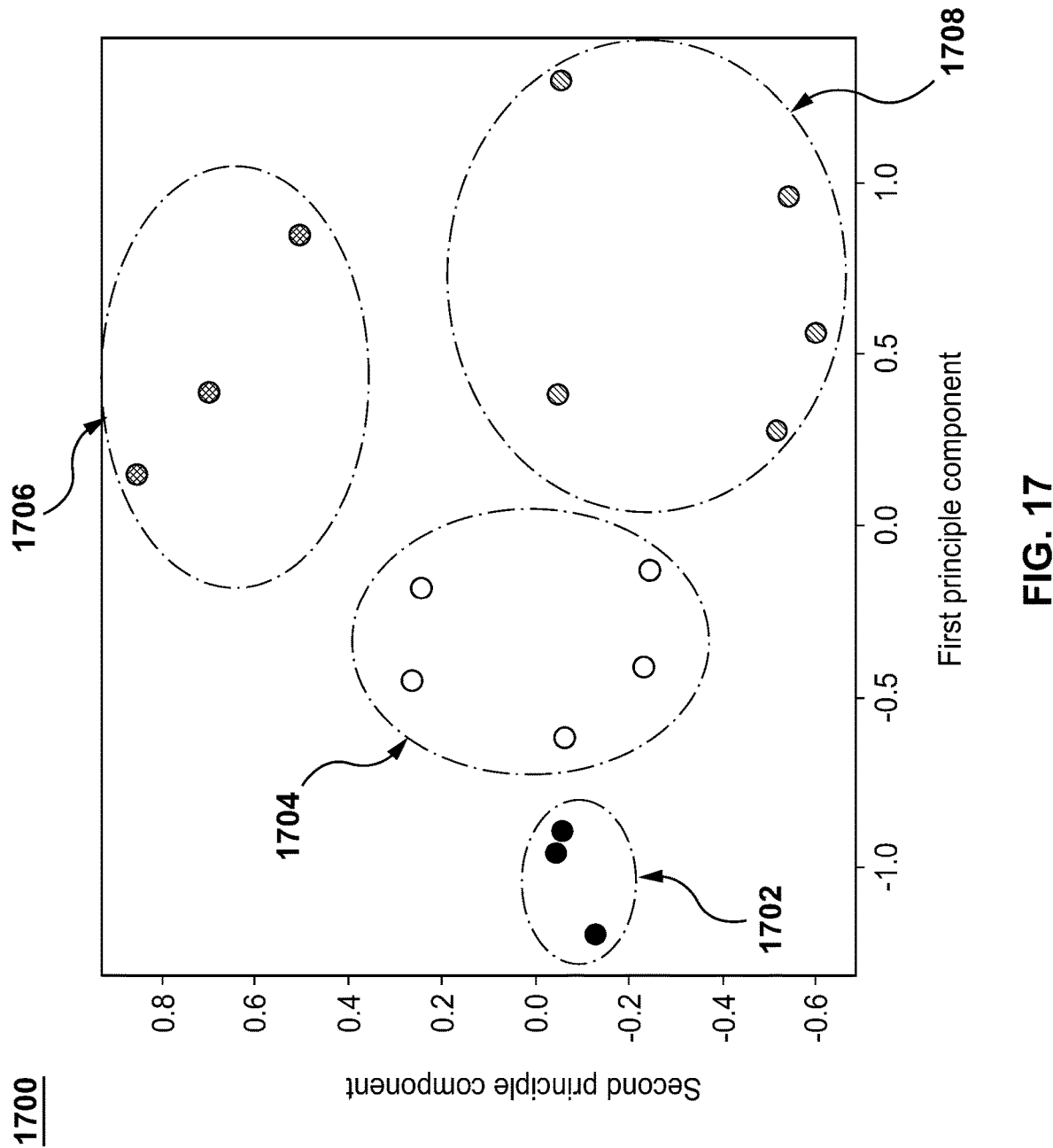
FIG. 17 illustrates classified groups, in accordance with various non-limiting embodiments of the present disclosure.

After being clustered, the compressed PDLUT generator 512 may classify the 16 subsets into 4 groups. FIG. 17 illustrates classified groups 1700, in accordance with various non-limiting embodiments of the present disclosure. The first group 1702 may include subsets 11, 14, and 15, the second group 1704 may include subsets 5, 6, 7, 9, 10, and 13, the third group 1706 may include subsets 4, 8, and 12, and the fourth group 1708 may include subsets 0, 1, 2, 3, and 5. It is contemplated that the number of classified groups may be increased or decreased. For a greater number of classified groups, the performance, in terms of pre-compensation of the symbols, may be slightly better. However, the size of the PDLUT may increase. The number of groups could be selected based on the trade-off between performance and complexity.

From each of the classified groups 1702, 1704, 1706, and 1708, compressed PDLUT generator 512 may select a base subset and represent other subsets in terms of the selected base subset. Without limiting the scope of present, in one example, the compressed PDLUT generator 512 may select the base subsets by performing blind search. In other example, the compressed PDLUT generator 512 may determine the base subset by taking an average of the subsets in a given classified group.

In one example, the compressed PDLUT generator 512 may perform mapping of the other subsets in a given classified group using a linear regression technique. A non-limiting example of the linear regression technique may be ax+b, where a and b may be the regression coefficient and x may represent approximate distortion correction values corresponding to the symbols −7 to 7 for the base subset. The compressed PDLUT generator 512 may generate a mapping table that may include the values of the regression coefficients a and b.

Figure 18:
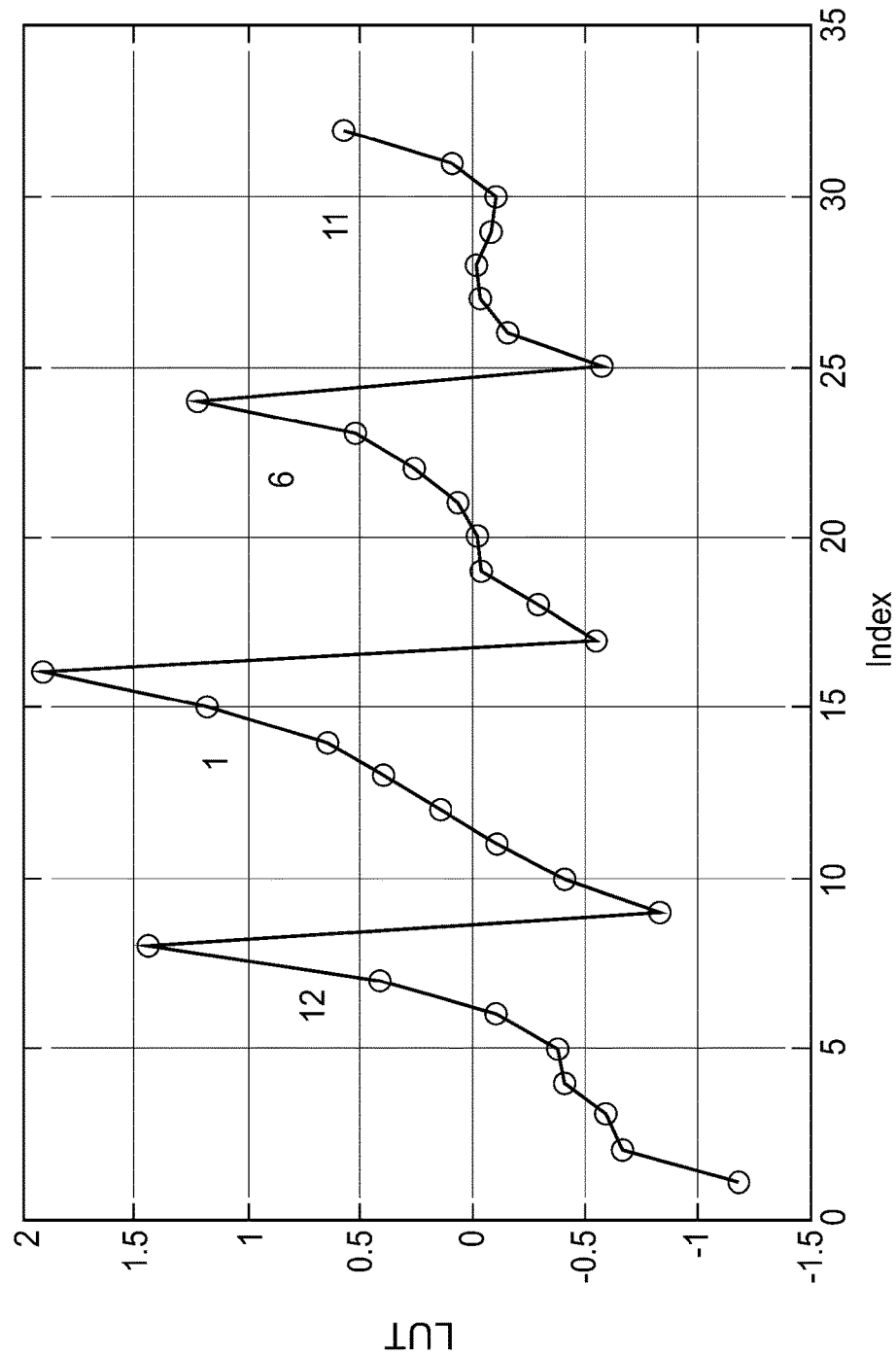
FIG. 18 illustrates a representation of the selected base subsets from the classified groups respectively, in accordance with various non-limiting embodiments of the present disclosure.

FIG. 18 illustrates a representation 1800 of the selected base subsets 12, 1, 6, and 11 from the groups 1702, 1704, 1706, and 1708 respectively, in accordance with various non-limiting embodiments of the present disclosure. Each subset may represent approximate distortion correction values corresponding to the symbols −7 to 7.

FIG. 19 illustrates a mapping table 1900 generated to map the subsets in a group to the corresponding base subset, in accordance with various non-limiting embodiments of the present disclosure. As shown, the table may include four classified groups. From the first group 1702, using the blind search technique, the compressed PDLUT generator 512 may select the subset 12 as the base subset. Further, using the linear regression technique, the compressed PDLUT generator 512 may determine the regression coefficients a and b corresponding to which the subsets 4, and 8 may be represented in terms of the subset 12 by using the relation ax+b. By way of example, to determine the approximate distortion correction value corresponding to the symbol −7 in the subset 4, the compressed PDLUT generator 512 may determine the approximate distortion correction value corresponding to the symbol −7 in the subset 12, multiply the determined value by 0.8511433 and add-0.075676. In this manner, the compressed PDLUT generator 512 may determine any approximate distortion correction value associated with the subsets 4 and 8 in terms of the regression coefficients a and b and the approximate distortion correction value associated with base subset 12.

Similarly, from the second group 1704, using the blind search technique, the compressed PDLUT generator 512 may select the subset 1 as the base subset. Further, using the linear regression technique, the compressed PDLUT generator 512 may determine the regression coefficients a and b corresponding to which the subsets 0, 2, 3, and 5 may be represented in terms of the subset 1 by using the relation ax+b. By way of example, to determine the approximate distortion correction value corresponding to the symbol 7 in the subset 0, the compressed PDLUT generator 512 may determine the approximate distortion correction value corresponding to the symbol 7 in the subset 1, multiply the determined value by 1.2105033 and add −0.204368. In this manner, the compressed PDLUT generator 512 may determine any approximate distortion correction value associated with the subsets 0, 2, 3, and 5 in terms of the regression coefficients a and b and the approximate distortion correction value associated with base subset 1.

It is clear from FIGS. 18 and 19 that the four base subsets may include 32 approximate distortion correction values, and the mapping table 1900 may include 24 values corresponding to the regression coefficients a and b. The four base subsets and the mapping table 1900 may further reduce the size of the compressed PDLUT from 128 to 56 value PDLUT.

Generally, the mapping table 1900 may include the base subsets and reference to the associated approximate distortion correction values, the subsets associated with each base subset, and the corresponding regression coefficients a and b. By virtue of the mapping table 1900, only the value of a and b corresponding to the subsets may be required to be stored instead of storing the associated approximate distortion correction values, thereby further reducing the size of the compressed PDLUT.

In addition to compressing the PDLUT, various embodiments of the present may be applicable to compress the cascaded PDLUTs as well. As an example, PDLUT2+3 may be considered in the following embodiments, however, it is contemplated that various embodiments of the present disclosure may be equally applicable to the other suitable cascade combinations of the PDLUT. Generally, the PDLUT2+3 may be referred to as cascaded PDLUT including a first PDLUT in which the length of the data symbol sequence is 2 and the under-correct symbol is at the right center of data symbol sequence and a second PDLUT in which the length of the data symbol sequence is 3 and the under-correct symbol is at the left center of data symbol sequence.

The compressed PDLUT generator 512 may generate two initial PDLUTs in a conventional manner as previously noted. For the purpose of simplicity, 64QAM with a memory length of 2 and 3 are assumed. Each value in the two initial PDLUTs may be corresponding to a data symbol sequence of lengths 2 and 3 (also referred to a sequence of memory lengths 2 and 3). For the PDLUT with the memory length 2, the right symbol in the data symbol sequence may be the under-correct symbol. For the PDLUT with the memory length 3, the left most symbol in the data symbol sequence may be the under-correct symbol. Since the modulation format assumed is 64QAM and the memory lengths are 2 and 3, the two PDLUTs may include a total of $8^2$=64, and $8^3$=512 distortion correction values respectively.

The compressed PDLUT generator 512 may rearrange the data symbol sequences in and the associated distortion correction values in the two initial PDLUTs in a manner that the data symbol sequences are symmetrical.

Figure 20:
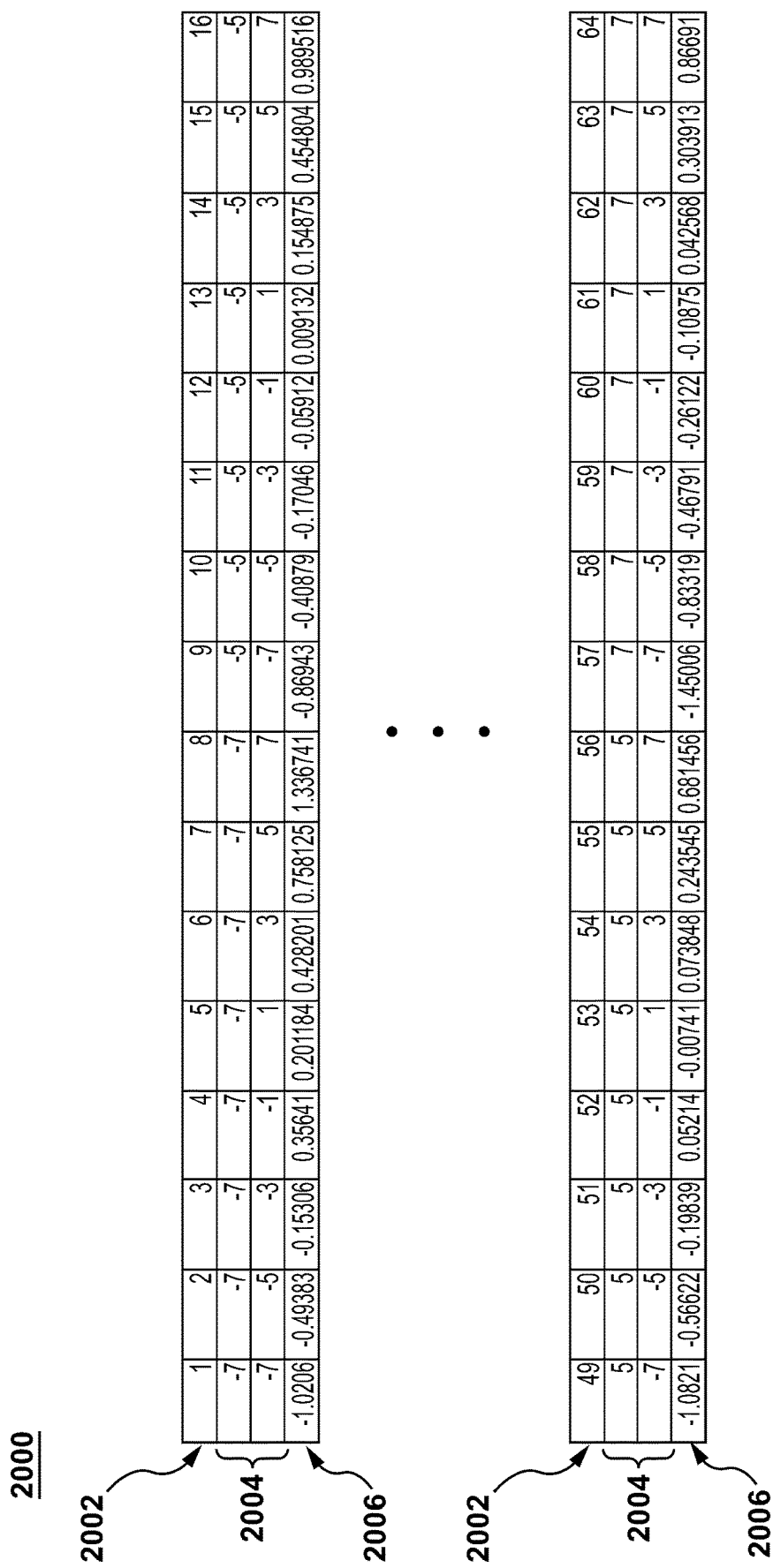
FIG. 20 illustrates a representative rearranged PDLUT (with memory length 2) in accordance with various non-limiting embodiments.

FIG. 20 illustrates a representative rearranged PDLUT (with memory length 2) 2000 in accordance with various non-limiting embodiments. The rearranged PDLUT 2000 may include an index 2002, data symbol sequences 2004, and associated distortion correction values 2006. The data symbols may be any one of [−7, −5, −3, −1, 1, 3, 5, 7]. The data symbol sequences 2004 may be arranged as follows: i) First, the left symbol is fixed at −7; ii) the right symbol is varied from −7 to 7; iii) The left symbol is changed from −7 to −5, the right symbol is varied from −7 to 7 and so on.

FIG. 21 illustrates a representative rearranged PDLUT (with memory length 3) 2100, in accordance with various non-limiting embodiments. The rearranged PDLUT 2100 may include an index 2102, data symbol sequences 2104, and associated distortion correction values 2106. The data symbols may be any one of [−7, −5, −3, −1, 1, 3, 5, 7]. The data symbol sequences 2104 may be arranged as follows: i) First, the right symbol is fixed at −7, the center symbol is fixed at −7, and the left symbol varies from −7 to 7; and ii) The center symbol is changed from −7 to −5, and the left symbol varies from −7 to 7, and so on.

Figure 22:
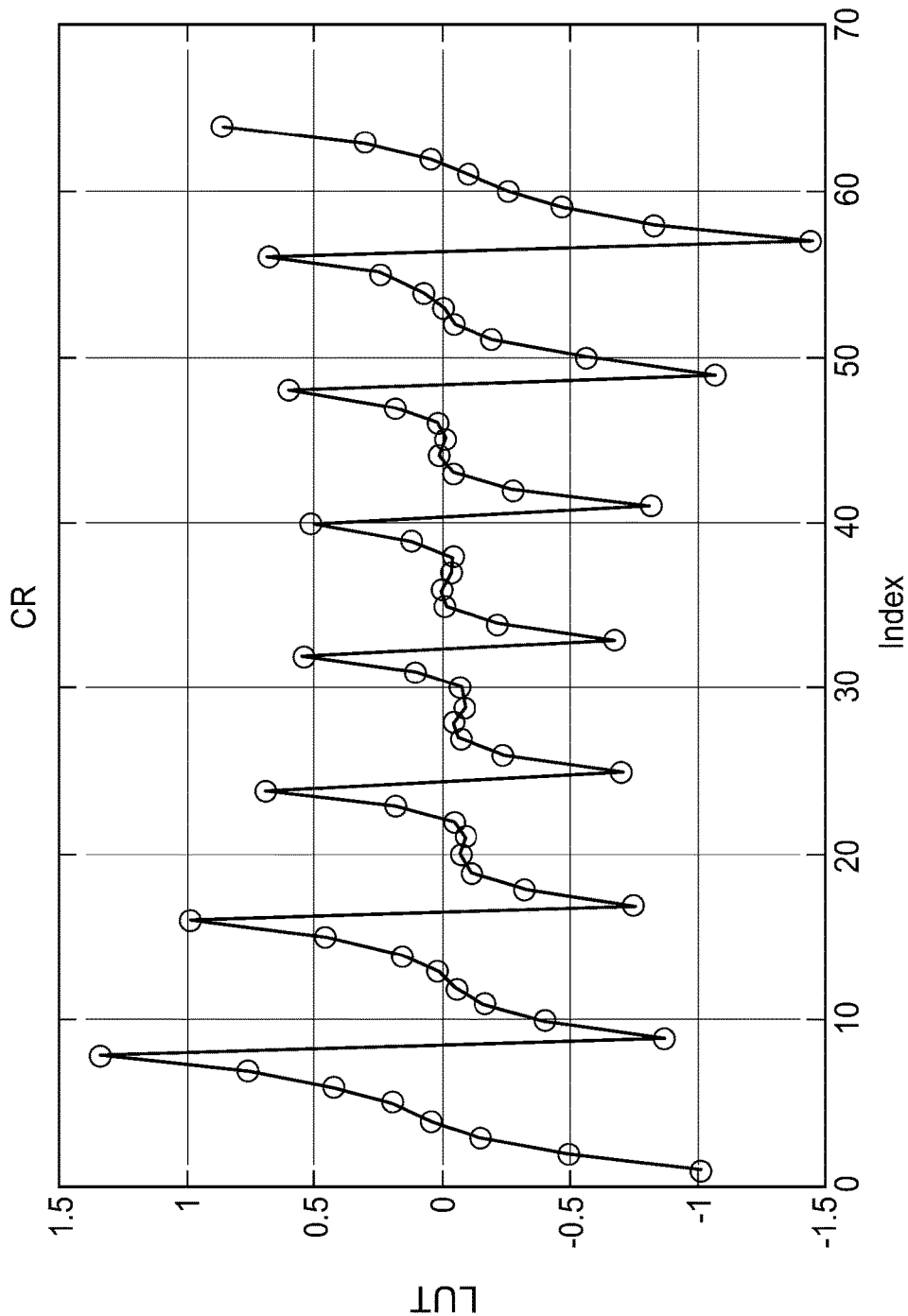
FIG. 22 illustrates a representation of the distortion correction values associated with the rearranged PDLUT (with memory length 2) plotted against the index, in accordance with various embodiments of the present disclosure.

FIG. 22 illustrates a representation 2200 of the distortion correction values 2006 plotted against the index 2002, in accordance with various embodiments of the present disclosure. As shown, the distortion correction values 2006 are approximately symmetrical about the center point of the index 2002. In other words, the distortion correction values 2006 may be symmetrical about the index value 32. The distortion correction values 2006 are approximately symmetrical as the sequences are opposite about the center point. For example, the first data symbol sequence is [−7 −7] and the last data symbol sequence [7 7] is opposite to the first data symbol sequence, therefore the distortion may be approximately equal and opposite to each other.

Figure 23:
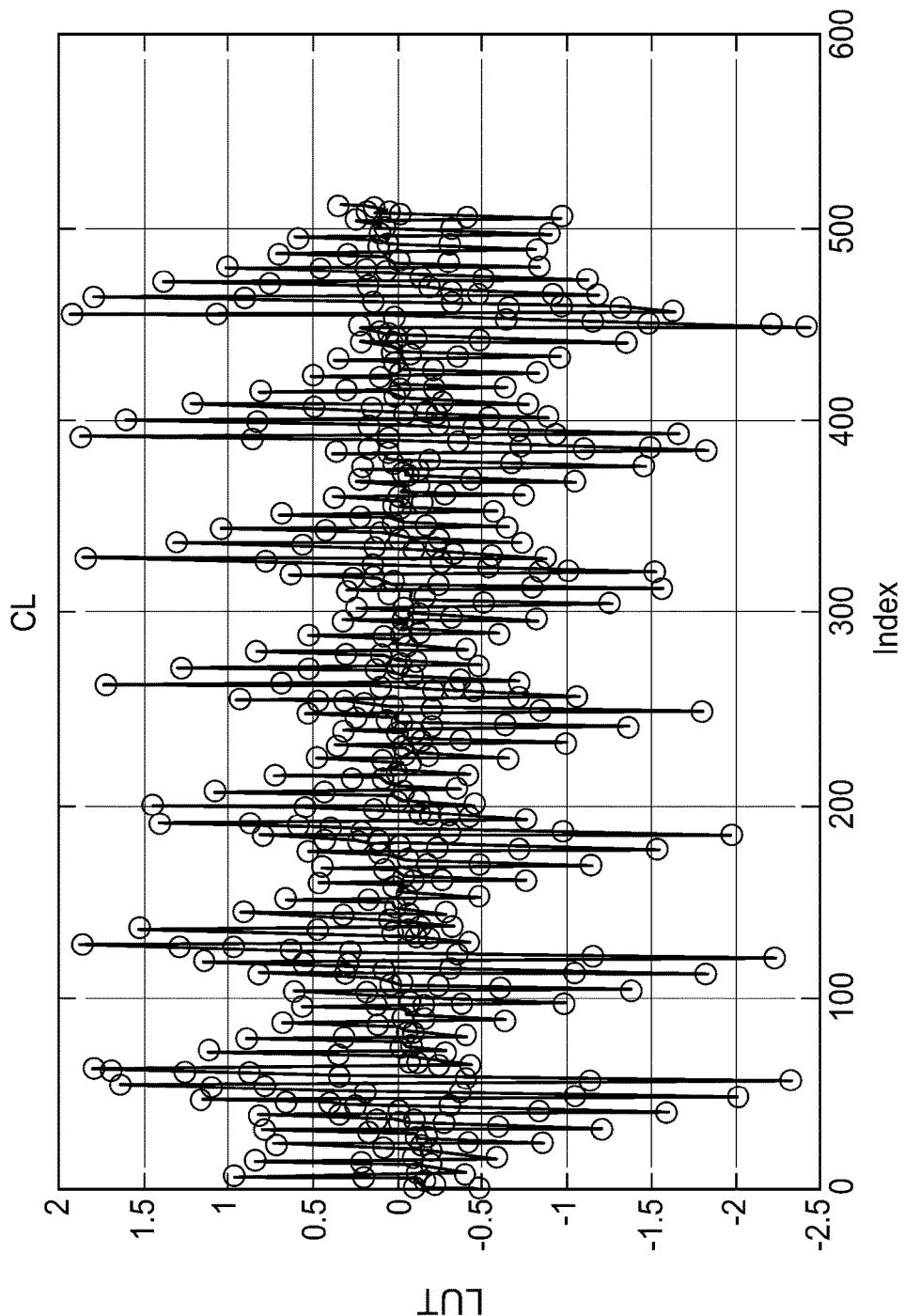
FIG. 23 illustrates a representation of the distortion correction values associated with the rearranged PDLUT (with memory length 3) plotted against the index, in accordance with various embodiments of the present disclosure.

FIG. 23 illustrates a representation 2300 of the distortion correction values 2106 plotted against the index 2102, in accordance with various embodiments of the present disclosure. As shown, the distortion correction values 2106 are approximately symmetrical about the center point of the index 2102. In other words, the distortion correction values 2106 may be symmetrical about the index value 256. The distortion correction values 2006 are approximately symmetrical as the sequences are opposite about the center point. For example, the first data symbol sequence is [−7 −7 −7] and the last data symbol sequence [7 7 7] is opposite to the first data symbol sequence, therefore the distortion may be approximately equal and opposite to each other.

To compress or reduce the size of the rearranged PDLUTs 2000 and 2100, in certain embodiments, the compressed PDLUT generator 512 may be configured to fold the rearranged PDLUTs 2000 and 2100 around the center point and multiply the folded distortion correction values by −1. In so doing, the distortion correction value associated with the last data symbol sequence may be overlapped with the distortion correction value associated with the first data symbol sequence. The distortion correction value associated with the second last data symbol sequence may be overlapped with the distortion correction value associated with the second data symbol sequence and so on. As previously noted that the two overlapped distortion correction values may be approximately same. The compressed PDLUT generator 512 may determine an approximate distortion correction from the two overlapped distortion correction values. In some embodiments, the compressed PDLUT generator 512 may take an average of the two overlapped distortion correction values. In other embodiments, the compressed PDLUT generator 512 may select any one of the two overlapped distortion correction values. In yet other embodiments, the compressed PDLUT generator 512 may add an offset value to the distortion correction values in a similar manner as discussed previously.

Figure 24:
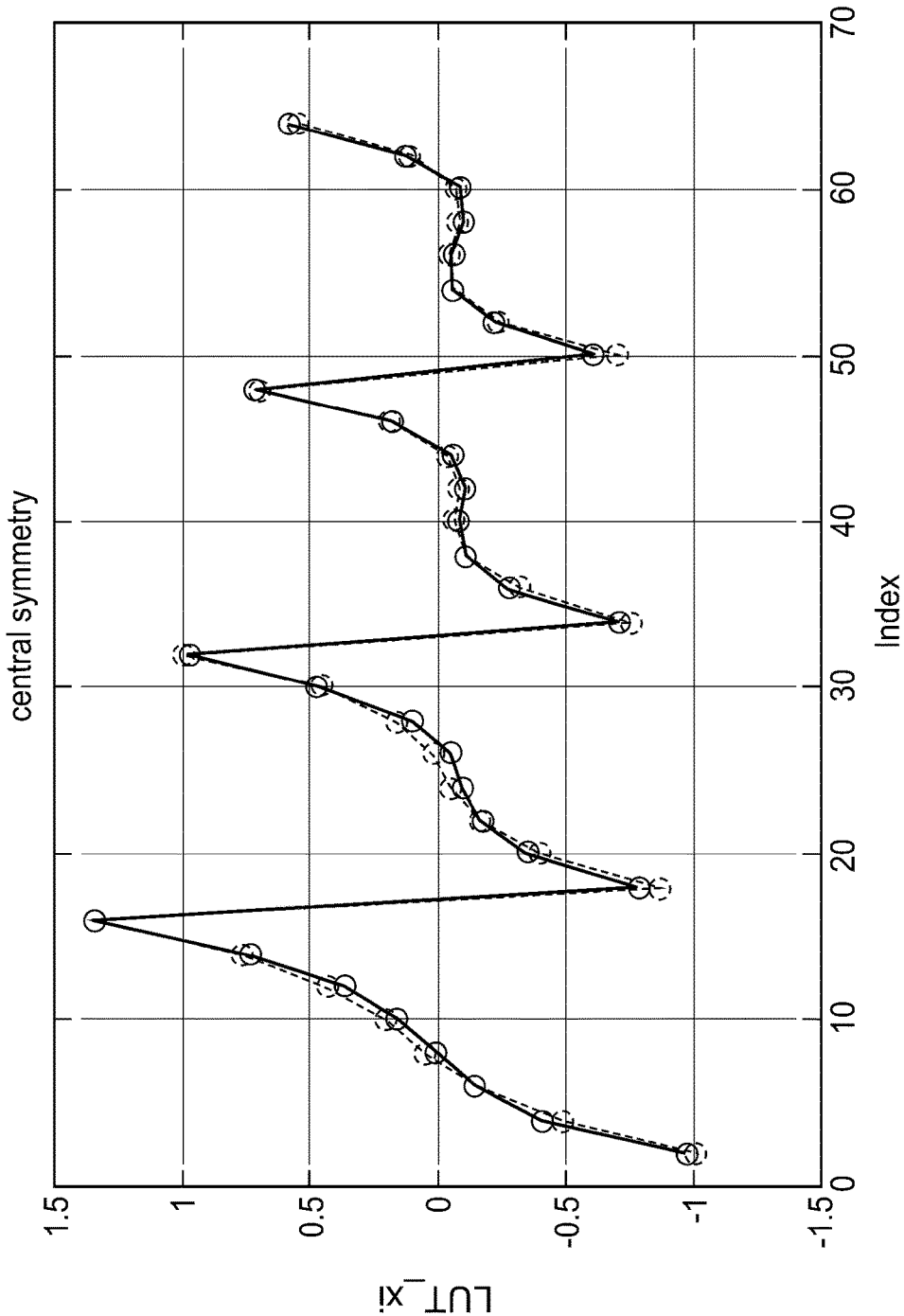
FIGS. 24-25 illustrate representations of folded PDLUTs corresponding to the rearranged PDLUT (with memory length 2) and the rearranged PDLUT (with memory length 3) respectively, in accordance with various non-limiting embodiments of the present disclosure.
Figure 25:
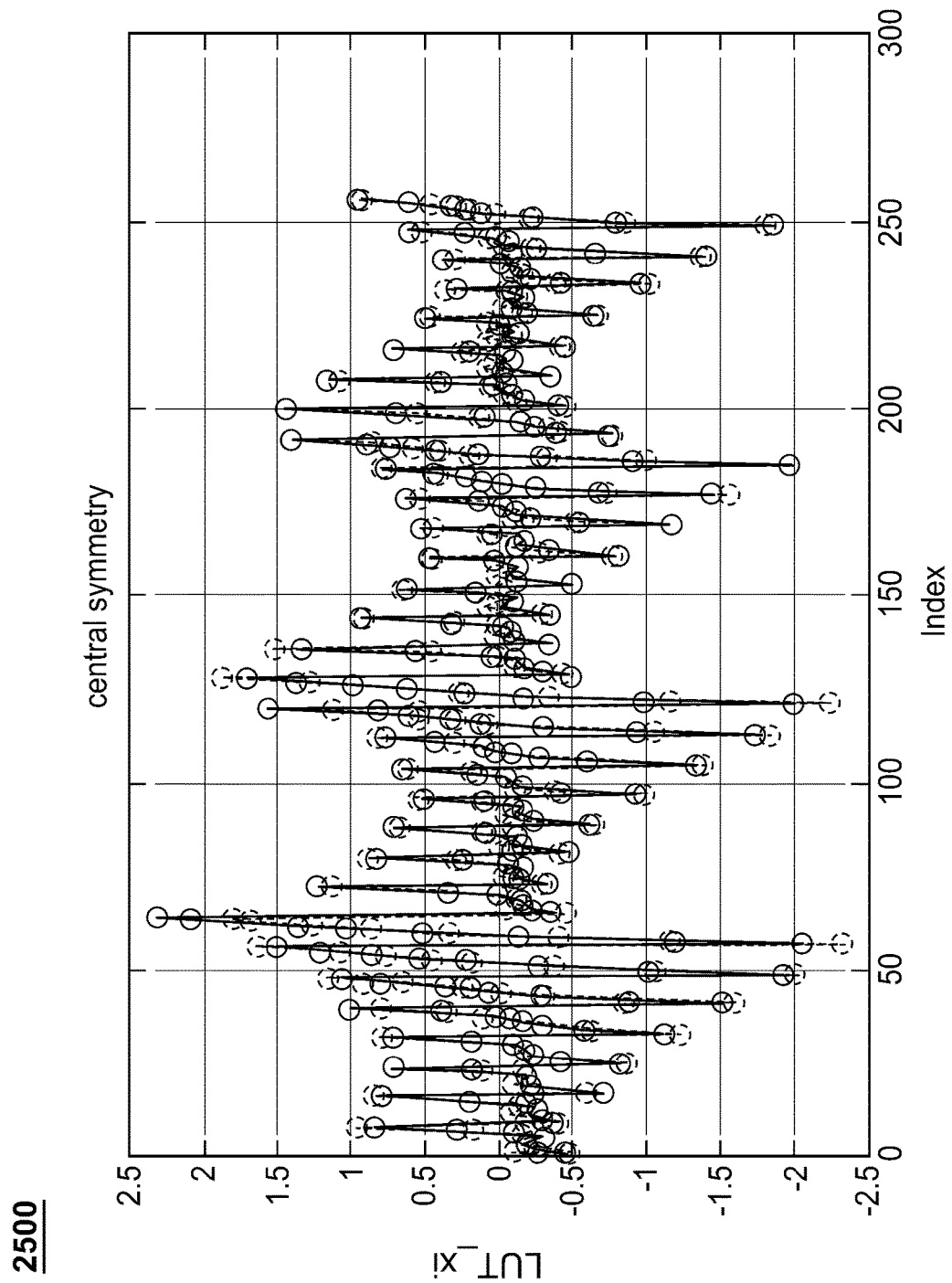

FIGS. 24-25 illustrate representations 2400 and 2500 of folded PDLUTs corresponding to the PDLUTs 2000 and 2100 respectively, in accordance with various non-limiting embodiments of the present disclosure. It is to be noted that the two overlapped distortion correction values may be approximately same. The compressed PDLUT generator 512 may determine an approximate distortion correction from the two overlapped distortion correction values by any suitable technique as previously discussed.

The compressed PDLUT generator 512 may reduce the size of the PDLUT 2000 from 64 and generate a compressed PDLUT having 32 indexes. Also, the compressed PDLUT generator 512 may reduce the size of the PDLUT 2100 from 512 and generate a compressed PDLUT having 256 indexes. Thus, by using this symmetry the size of the PDLUT 2000 and 2100 may be reduced to half of the original (i.e., from 64+512 to 32+256).

In certain non-limiting embodiments, the compressed PDLUT generator 512 may further reduce the size of the PDLUT by applying the unification technique as previously discussed over the compressed PDLUT (with memory length 3). Similar to the previous embodiments, the compressed PDLUT generator 512 may segregate the approximate distortion correction values in the compressed PDLUT (with memory length 3) into 32 subsets 0, 1, 2 . . . 31. Each subset may include 8 approximate distortion correction values corresponding to the under-correct symbol varying from −7 to 7. As previously discussed, at least some of the subsets may be similar to each other, and therefore the subsets may be classified into several groups based on the respective similarity. For each group, one subset may be selected as a base subset while the other subsets may be represented in terms of the base subset.

Figure 26:
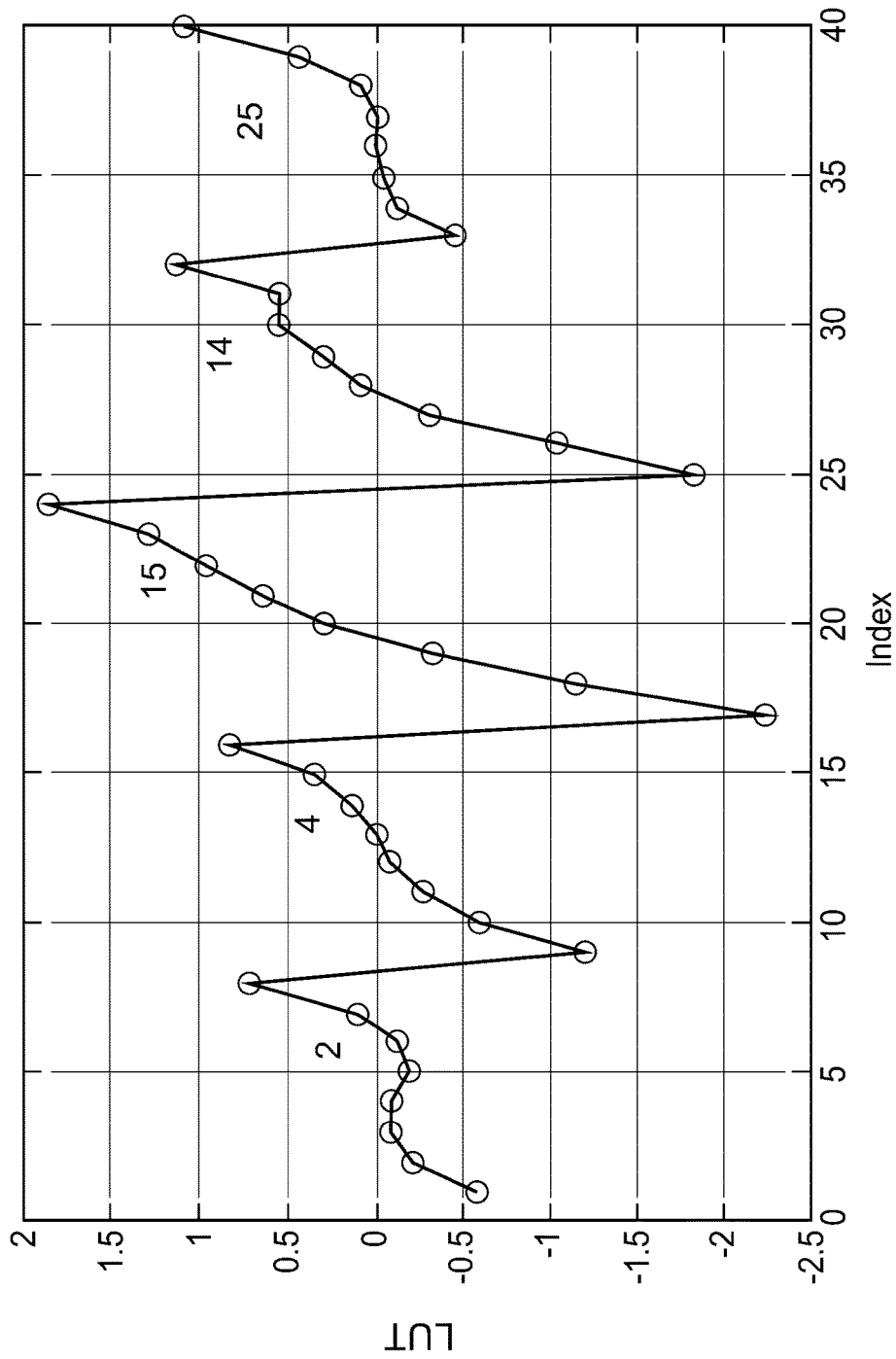
FIG. 26 illustrates a representation of the selected base subsets 2, 4, 15, 14, and 25 from the five groups respectively, in accordance with various non-limiting embodiments of the present disclosure.

Based on the AI clustering, the compressed PDLUT generator 512 may classify the 32 subsets into five groups. The compressed PDLUT generator 512 may select one base subset from each of the five groups. FIG. 26 illustrates a representation 2600 of the selected base subsets 2, 4, 15, 14, and 25 from the five groups respectively, in accordance with various non-limiting embodiments of the present disclosure. Each subset may represent approximate distortion correction values corresponding to the symbols −7 to 7.

FIG. 27 illustrates a mapping table 2700 generated to map the subsets in a group to the corresponding base subset, in accordance with various non-limiting embodiments of the present disclosure. As shown, the table may include five classified groups 2702, 2704, 2706, 2708, and 2708. The first group 2702 may include subsets 2, 10, 11, 18, 19, 20, 27, and 28, out which the compressed PDLUT generator 512 may select subset 2 as the base subset. The second group 2704 may include subsets 3, 4, 12, 13, 21, 29, and 30, out which the compressed PDLUT generator 512 may select subset 4 as the base subset. The third group 2704 may include subsets 6, 7, 15, and 23, out which the compressed PDLUT generator 512 may select subset 15 as the base subset. The fourth group 2706 may include subsets 5, 14, 22, and 31, out which the compressed PDLUT generator 512 may select subset 14 as the base subset. The fifth group 2710 may include subsets 0, 1, 8, 9, 16, 17, 24, 25, and 26, out which the compressed PDLUT generator 512 may select subset 25 as a base subset.

Further, using the linear regression technique, the compressed PDLUT generator 512 may determine the regression coefficients a and b corresponding to which the subsets may be represented in terms of the base subset by using the relation ax+b. It is understood that the five base subsets may include 40 approximate distortion correction values, and the mapping table may include 54 values corresponding to the regression coefficients a and b. Thus, by virtue of the mapping table 2700, a size of the compressed PDLUT (with memory length 3) may be significantly reduced from the 256-values PDLUT to 94-values PDLUT.

Returning to FIG. 5, once the compressed PDLUT generator 512 may provide the compressed PDLUT to the symbol corrector 504. The symbol corrector 504 may pre-compensate the incoming data symbols to reduce the effect non-linear distortions. The symbol corrector 504 may be implemented in any suitable manner. Depending on how the compressed PDLUT has been implemented, the implementation of the symbol corrector 504 may vary.

Figure 28:
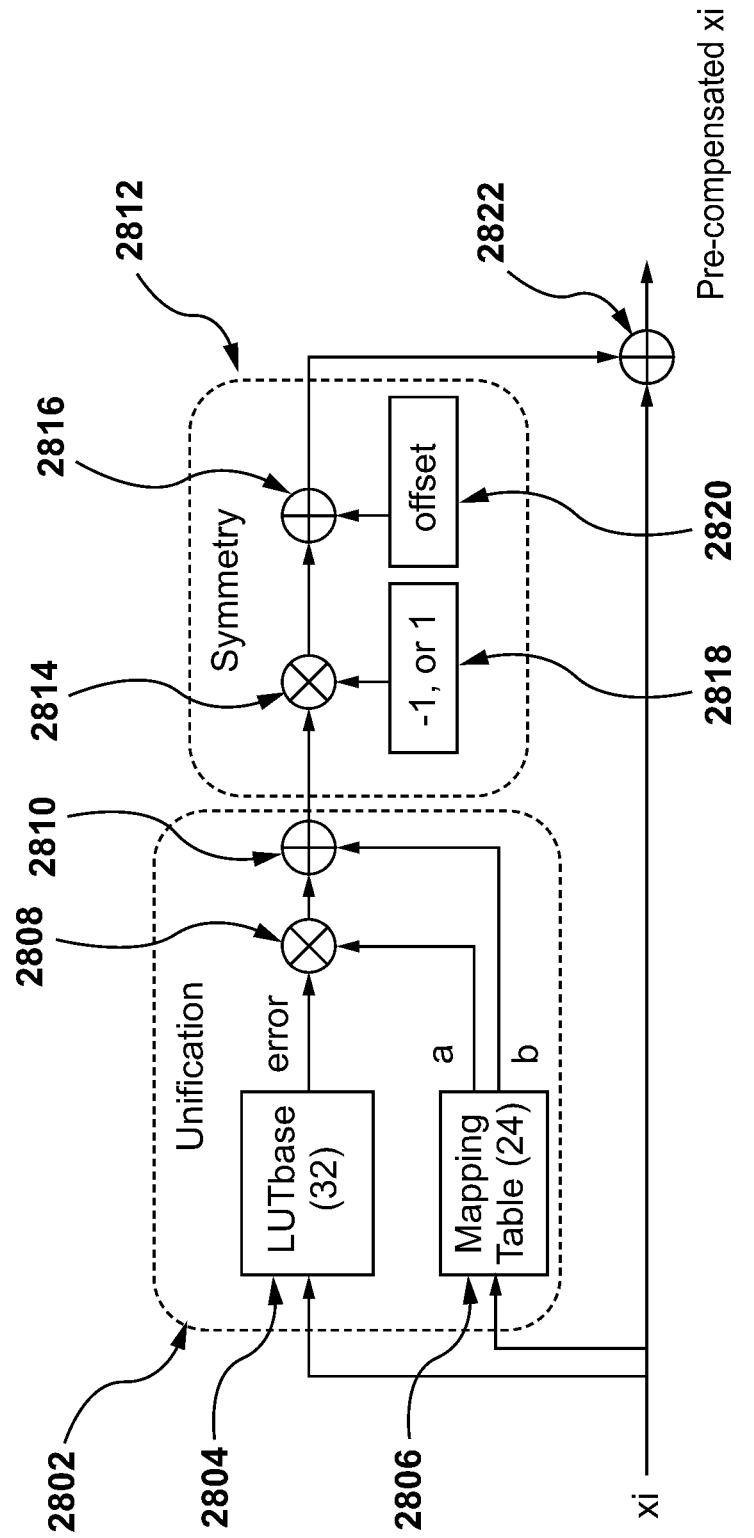
FIG. 28 illustrates a first implementation of a symbol corrector, where the compressed PDLUT is generated based on the symmetry and unification of the PDLUT, in accordance with various embodiments of the present disclosure.

FIG. 28 illustrates a first implementation 2800 of the symbol corrector 504 where the compressed PDLUT is generated based on the symmetry and unification of the PDLUT, in accordance with various embodiments of the present disclosure. The first implementation 2800 may include a unification module 2802 and a symmetry compensation module 2812. The unification module 2802 may include base subsets 2804, a mapping table 2806, a first multiplier 2808, and a first adder 2810. The base subsets 2804 and the mapping table 2806 may be stored in a memory element (not illustrated). The symmetry module 2812 may include a second multiplier 2814, a second adder 2816, a negator 2818, an offset compensator 2820, and a third adder 2822. It is contemplated that various modules and components of the first implementation 2800 may be implemented on one or more processors and instructions for the execution of various associated functionalities may be stored in one or more memory elements.

The unification module 2802 may be configured to receive a data symbol sequence, for example, [−7 −5 7]. The middle symbol in the sequence may be the under-correct symbol and may require pre-compensation. The unification module 2802 may identify the data symbol sequence and accordingly may select a suitable base subset from the base subsets 2802. In case, the data symbol sequence is included in the selected base subset, the unification module 2802 may select the corresponding approximate distortion correction value. In case, the data symbol sequence is related to one of the subsets associated with the selected base subset, the unification module 2802 may select the closest approximate distortion correction value from the selected base subset and may fetch the suitable regression coefficients a and b from the mapping table 2806.

The first multiplier 2808 may be configured to multiply the regression coefficient a with the closest approximate distortion correction value and the first adder 2810 may add the regression coefficient b to the output of the first multiplier 2808 to generate the required approximate distortion correction value.

There may be certain scenarios in which the exact data symbol sequence may not be included in the subsets, however, the subsets may include a data symbol sequence which may be opposite to the data symbol sequence received by the unification module 2802. The generated required approximate distortion correction value may be negative of the actual required approximate distortion correction value. In such scenarios, based on an input from the negator 2818, the second multiplier 2814 may be configured to multiply the generated required approximate distortion correction value with −1 and generate the corrected approximate distortion correction value.

In certain non-liming embodiments, the offset compensator 2820 may be configured to provide certain adjustments to the approximate distortion value generated by the second multiplier 2814. The offset value may be added by the second adder 2816. Finally, the approximate distortion correction value may be added to the under-correct symbol by the third adder 2822.

Figure 29:
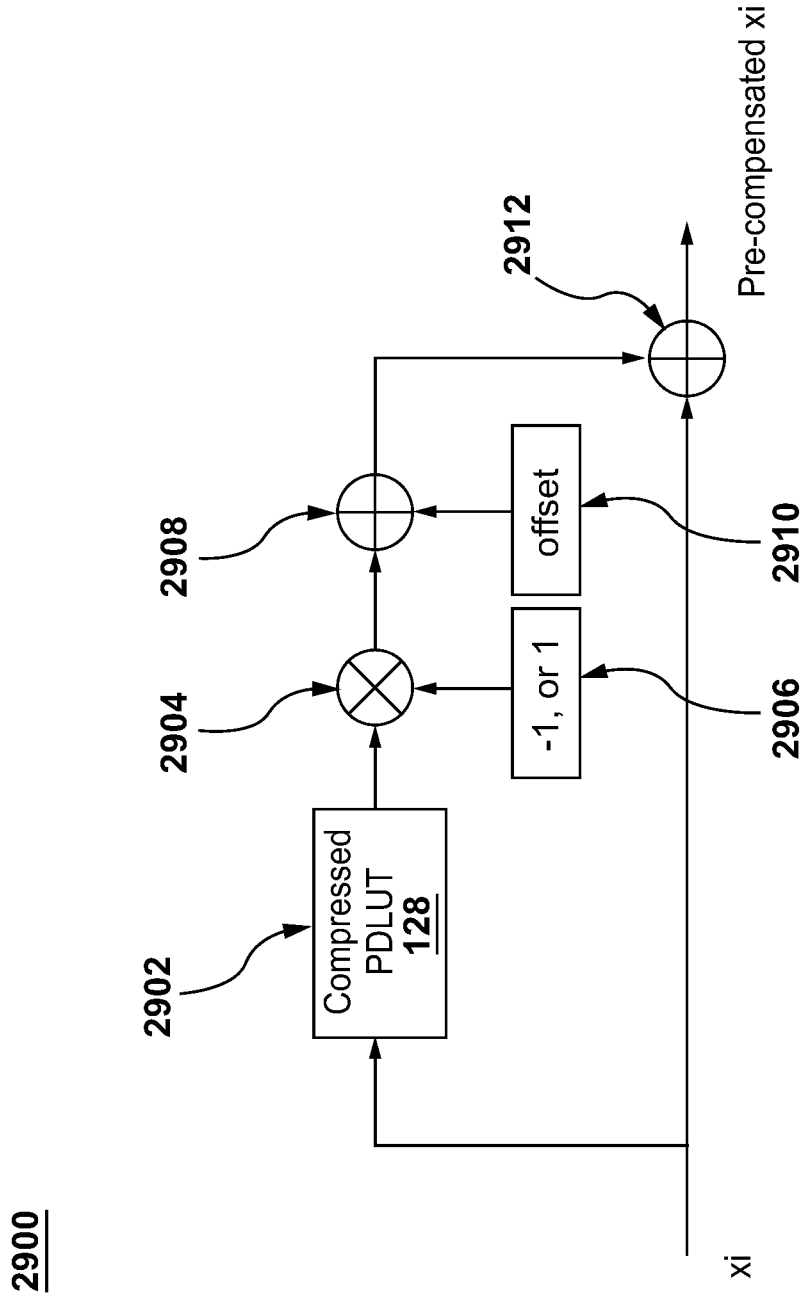
FIG. 29 illustrates a second implementation of the symbol corrector, where the compressed PDLUT is generated based on the symmetry of the PDLUT, in accordance with various embodiments of the present disclosure.

FIG. 29 illustrates a second implementation 2900 of the symbol corrector 504 where the compressed PDLUT is generated based on the symmetry of the PDLUT, in accordance with various embodiments of the present disclosure. As shown, the second implementation 2900 may include a compressed PDLUT 2902, a multiplier 2904, a negator 2818, a first adder 2908, and offset compensator 2910, and a second adder 2912. It is contemplated that various modules and components of the first implementation 2800 may be implemented on one or more processors and instructions for the execution of various associated functionalities may be stored in one or more memory elements.

The compressed PDLUT 2902 may be configured to receive a data symbol sequence, for example, [−7 −5 7]. The middle symbol in the sequence may be the under-correct symbol and may require pre-compensation. The compressed PDLUT 2902 may identify the data symbol sequence and accordingly may select an approximate distortion correction value from the compressed PDLUT.

There may be certain scenarios in which the exact data symbol sequence may not be included in the compressed PDLUT 2902, however, the compressed PDLUT 2902 may include a data symbol sequence which may be opposite to the data symbol sequence received by the compressed PDLUT 2902. The generated required approximate distortion correction value may be negative of the actual required approximate distortion correction value. In such scenarios, based on an input from the negator 2906, the multiplier 2904 may be configured to multiply the generated required approximate distortion correction value with −1 and generate the corrected approximate distortion correction value.

In certain non-liming embodiments, the offset compensator 2910 may be configured to provide certain adjustments to the approximate distortion value generated by the multiplier 2904. The offset value may be added by the adder 2908. Finally, the approximate distortion correction value may be added to the under-correct symbol by the second adder 2912.

FIG. 30 illustrates a performance comparison table 3000, in accordance with various non-limiting embodiments of the present disclosure. As shown, for 64QAM modulation format, the BER without any pre-compensation technique may be approximately equal to 0.0445. PDLUT3 (i.e., PDLUT with memory length 3 and without compression) improves the BER performance largely as compared to that without any pre-compensation techniques. The BER with PDLUT3 may be around 0.025986. However, the size of the PDLUT is significantly large, it may require 512 entries in the PDLUT. With symmetry simplification only, even though the BER slightly degrades to approximately 0.026439 but the size of PDLUT may be reduced from 512 to 128. With the combined simplification of symmetry and unification, the BER performance further slightly degrades to 0.026953, which is still very close to the performance of original PDLUT3. However, the size of PDLUT may be significantly reduced from 512 to 56.

Figure 31:
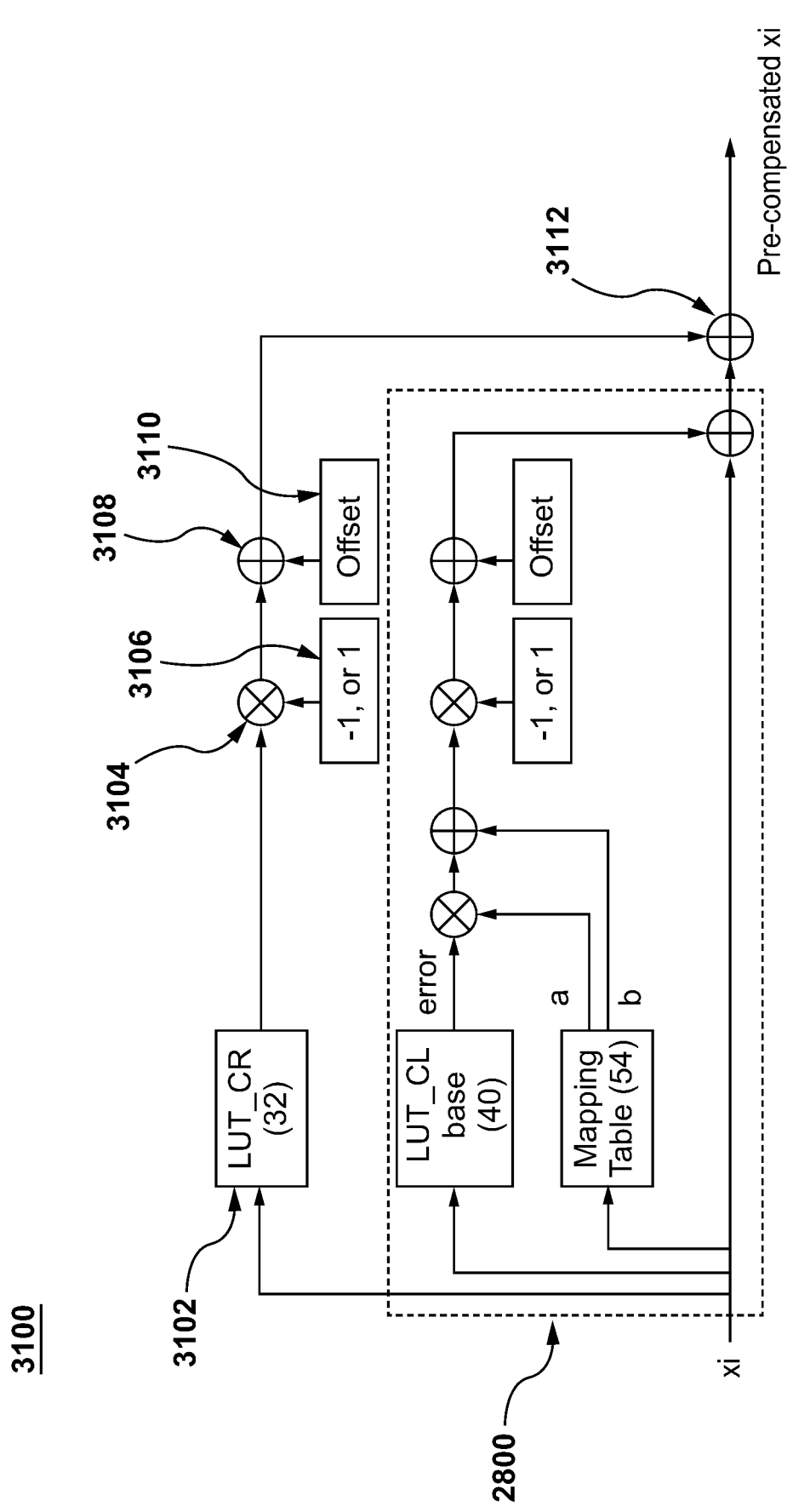
FIG. 31 illustrates a third implementation of the symbol corrector where the compressed PDLUT is generated based cascaded PDLUT using the symmetry and unification of the PDLUT, in accordance with various embodiments of the present disclosure.

FIG. 31 illustrates a third implementation 3100 of the symbol corrector 504 where the compressed PDLUT is generated based cascaded PDLUT using the symmetry and unification of the PDLUT, in accordance with various embodiments of the present disclosure. The third implementation 3100 may be an extension of the first implementation 2800. The third implementation 3100 may include the components of the first implementation and additionally, the third implementation 3100 may include base subsets 3102 corresponding to the compressed CR PDLUT, a multiplier 3104, a negator 3106, a first adder 3108, an offset compensator 3110, and a second adder 3112.

The third implementation 3100 may be configured to process the data symbol sequence using the compressed cascaded PDLUT. While the base subsets 3102, multiplier 3104, negator 3106, first adder 3108, and the offset compensator 3110 process the CR data symbol sequence, the second implementation 2800 may process the CL data symbol sequence. Finally, the approximate distortion correction value may be added to the under-correct symbol by the second adder 3112.

FIG. 32 illustrates a performance comparison table 3200 corresponding to the cascaded PDLUT, in accordance with various non-limiting embodiments of the present disclosure. As shown, for 64 QAM modulation format, the BER performance without any pre-compensation technique may be approximately equal to 0.0445. PDLUT3+3 improves the BER performance largely as compared to that without any pre-compensation techniques. The BER performance with PDLUT3+3 may be around 0.023906. However, the size of the PDLUT3+3 is significantly large, it may require 1024 entries in the PDLUT. The BER performance with PDLUT3+2 may be around 0.027265 which is slightly higher than the BER performance corresponding to the PDLUT3+3. However, the size of the PDLUT3+2 is smaller, and it may require 576 entries only. The BER performance with PDLUT2+3 may be around 0.023969, which is significantly less as compared to the BER performance corresponding to the PDLUT3+2 for the same PDLUT size. With symmetry simplification only, even though the BER performance with PDLUT2+3 slightly degrades to approximately 0.024288 but the size of PDLUT may be reduced from 576 to 288. With the combined simplification of symmetry and unification, the BER performance further slightly degrades to 0.024666, which is still very close to the performance of original PDLUT2+3. However, the size of PDLUT may be significantly reduced from 576 to 126. Moreover, the hardware complexity may be reduced significantly.

Figure 33:
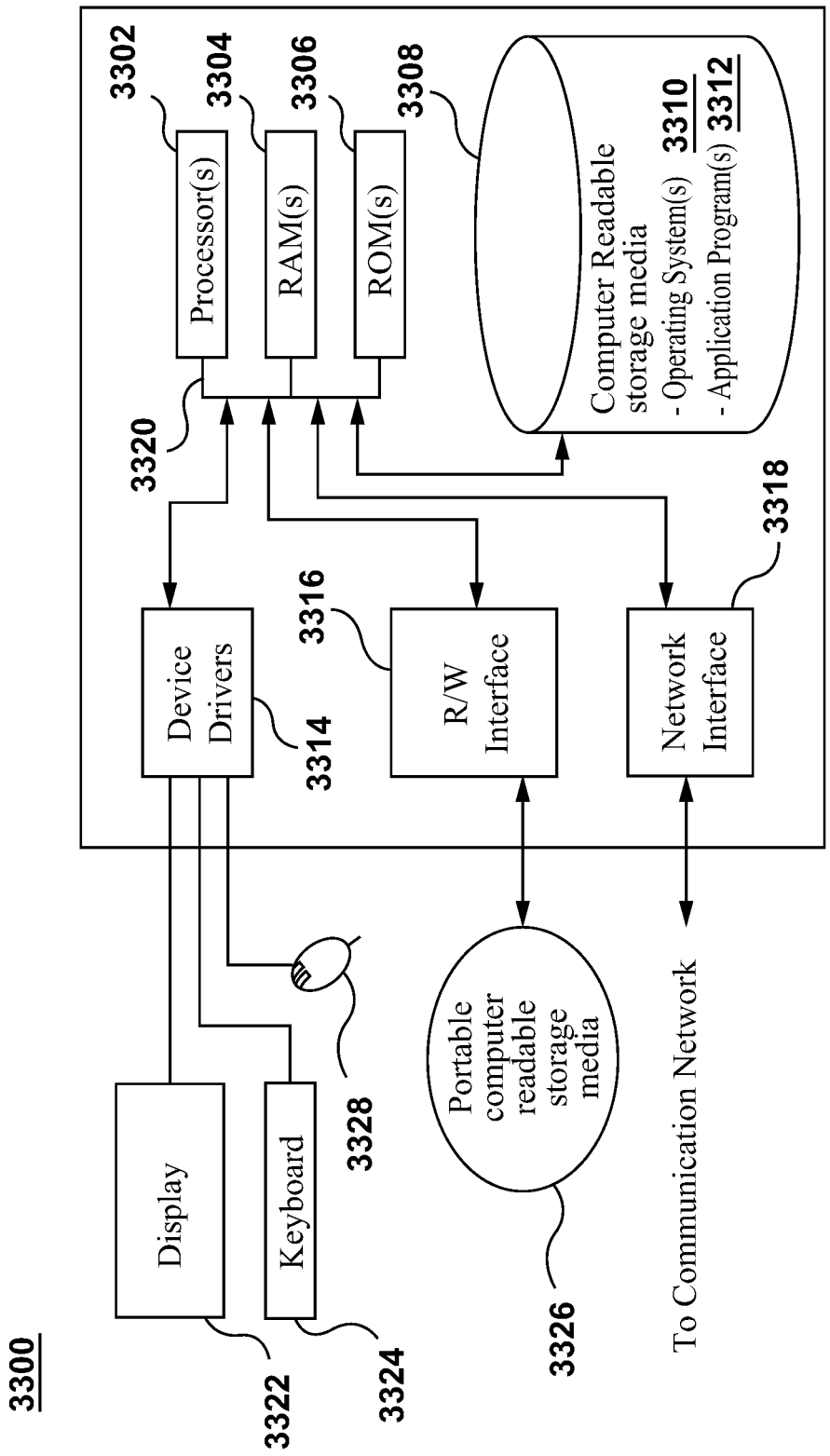
FIG. 33 depicts a high-level block diagram of representative components for the compressed PDLUT generator, in accordance with various embodiments of the present disclosure.

FIG. 33 depicts a high-level block diagram of representative components for the compressed PDLUT generator 512, in accordance with various embodiments of the present disclosure. It should be appreciated that FIG. 33 provides only an illustration of one implementation of the compressed PDLUT generator 512 and does not imply any limitations with regard to the environments in which different embodiments may be implemented. Many modifications to the depicted environment can be done to implement the compressed PDLUT generator 512 without departing from the principles presented herein.

As shown, the compressed PDLUT generator 512 employs one or more processors 3302, one or more computer-readable random access memories (RAMs) 3304, one or more computer-readable read only memories (ROMs) 3306, one or more computer-readable storage media 3308, device drivers 3314, a read/write (R/W) interface 3316, a network interface 3318, all interconnected over a communications fabric 3320. Communication fabric 3320 may be implemented with any architecture designed for passing data and/or control information between processors (such as microprocessors, communications and network processors, etc.), memory, peripheral devices, and any other hardware components within a system.

One or more operating system(s) 3310 and one or more application program(s) 3312 are stored on one or more of computer-readable storage media 3308 for execution by one or more of the processors 3302 via one or more of the respective RAMs 3304 (which typically include a cache memory). In the illustrated embodiment, each of computer-readable storage media 3308 may be a magnetic disk storage device of an internal hard drive, CD-ROM, DVD, memory stick, magnetic tape, magnetic disk, optical disc, a semiconductor storage device such as RAM, ROM, EPROM, flash memory or any other computer-readable tangible storage device that can store a computer program and digital information.

The compressed PDLUT generator 512 may also include the R/W drive or interface 3316 to read from and write to one or more portable computer readable storage media 3328. Application programs 3312 on said devices may be stored on one or more of the portable computer readable storage media 3328, read via the respective R/W drive or interface 3316 and loaded into the respective computer readable storage media 3308.

It will be appreciated that in certain embodiments the application programs 3312 stored on one or more of the portable computer readable storage media 3328 may configure the compressed PDLUT generator 512 to provide various functionalities, in accordance with various embodiments of the present disclosure.

The application programs 3312 on the said the compressed PDLUT generator 512 may be downloaded to the compressed PDLUT generator 512 from an external computer or external storage device via a communication network (for example, the Internet, a local area network or other wide area network or wireless network) and network interface 3318. From network interface 3318, the programs may be loaded onto computer-readable storage media 3308.

The compressed PDLUT generator 512 may also include a display screen 3322, a keyboard or keypad 3324, and a computer mouse or touchpad 3324. The device drivers 3314 may interface to display screen 3322 for imaging, to keyboard or keypad 3324, to a computer mouse or touchpad 3324, and/or to display screen 3322 (in case of touch-screen display) for pressure sensing of alphanumeric character entry and user selections. The device drivers 3314, R/W interface 3316 and network interface 3318 may comprise hardware and software (stored on computer-readable storage media 3308 and/or ROM 3306).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

It will be appreciated that the compressed PDLUT generator 512 may be a server, a desktop computer, a laptop computer, a tablet, a smartphone, a personal digital assistant or any device that may be configured to implement the present technology, as should be understood by a person skilled in the art.

Figure 34:
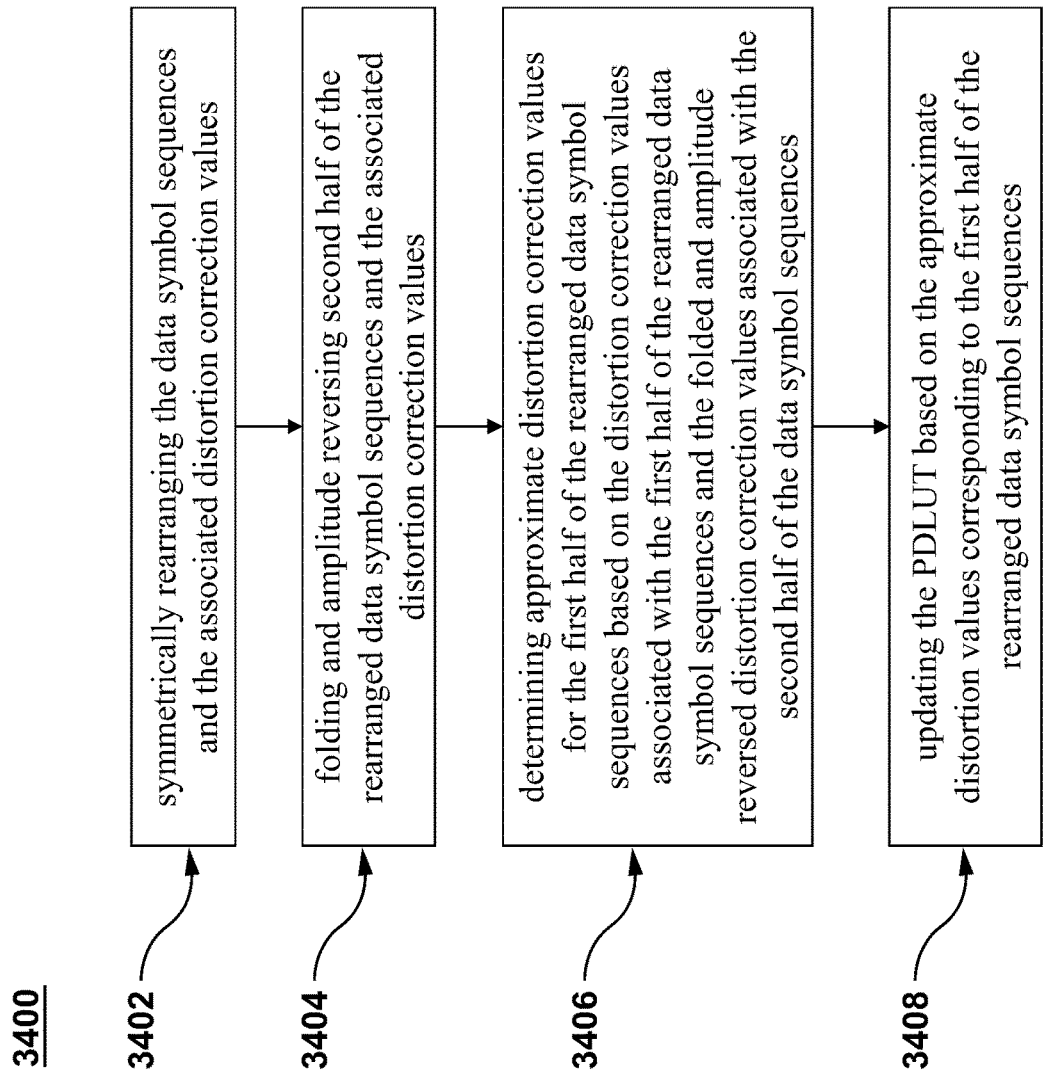
FIG. 34 illustrates a process representing a method of compressing a Pattern Dependent Look-up Table (PDLUT) including distortion correction values corresponding to data symbol sequences, in accordance with various embodiments of the present disclosure.

FIG. 34 illustrates a process 3400 representing a method of compressing a Pattern Dependent Look-up Table (PDLUT) including distortion correction values corresponding to data symbol sequences, in accordance with various embodiments of the present disclosure. As shown, the process 3400 commences at step 3402 where the compressed PDLUT generator 512 symmetrically rearranges the data symbol sequence and the associated distortion correction values.

The process 3400 advances to step 3404 where the compressed PDLUT generator 512 folds and amplitude reverses second half of the rearranged data symbol sequences and the associated distortion correction values.

The process 3400 proceeds to step 3406 where the compressed PDLUT generator 512 determines approximate distortion correction values for the first half of the rearranged data symbol sequences based on the distortion correction values associated with the first half of the rearranged data symbol sequences and the folded and amplitude reversed distortion correction values associated with the second half of the data symbol sequences.

Finally ate step 3408, the compressed PDLUT generator 512 updates the PDLUT based on the approximate distortion values corresponding to the first half of the rearranged data symbol sequences.

Figure 35:
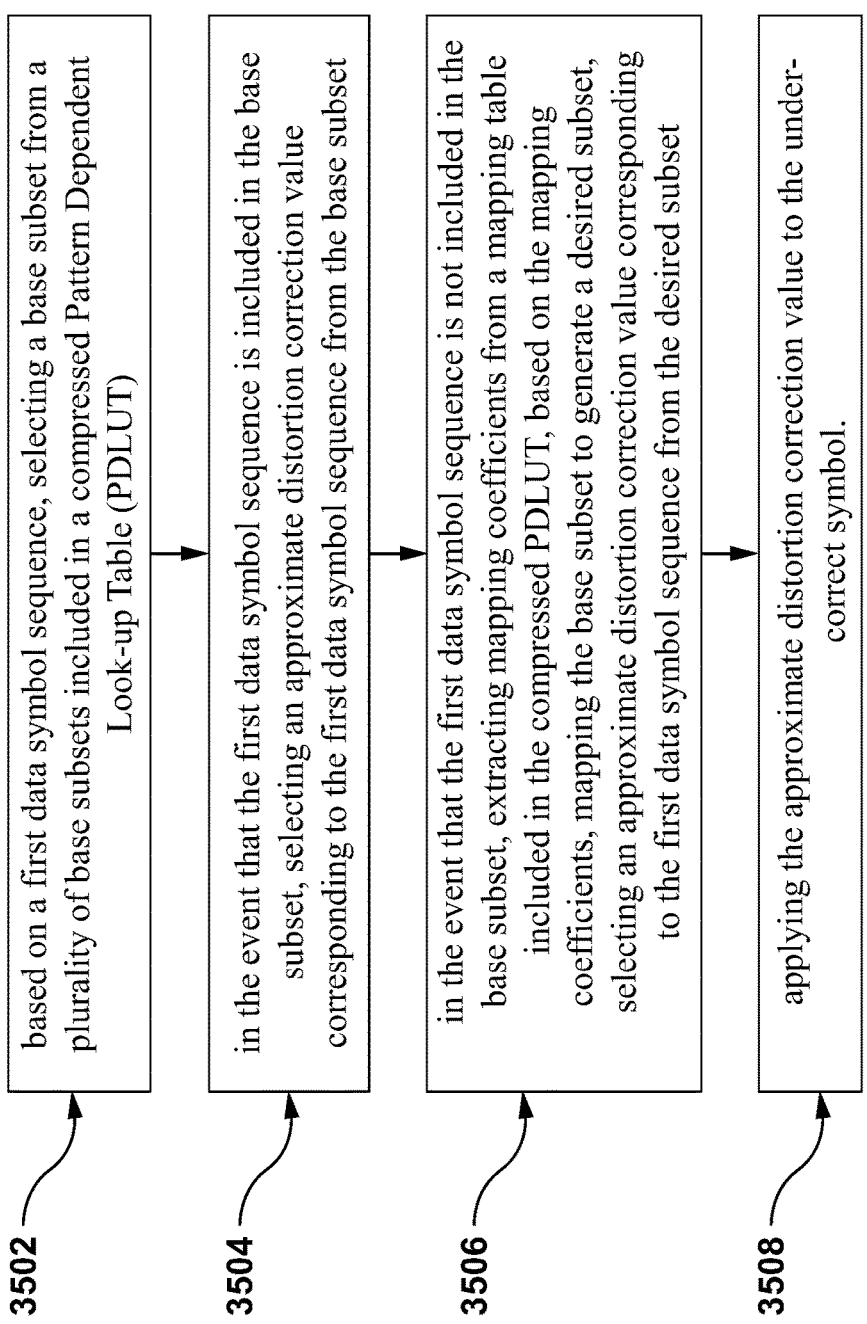
FIG. 35 illustrates a process representing a method for pre-compensating an under-correct symbol, in accordance with various embodiments of the present disclosure.

FIG. 35 illustrates a process 3500 representing a method for pre-compensating an under-correct symbol, in accordance with various embodiments of the present disclosure. As shown, the process 3500 commences at step 3502, where based on a first data symbol sequence, the symbol corrector 504 selects a base subset from a plurality of base subsets included in a compressed Pattern Dependent Look-up Table (PDLUT).

The process 3500 advances to step 3504 where in the event that the first data symbol sequence is included in the base subset, the symbol corrector 504 selects an approximate distortion correction value corresponding to the first data symbol sequence from the base subset.

The process 3500 advances to step 3506 where in the event that the first data symbol sequence is not included in the base subset, the symbol corrector 504 extracts mapping coefficients from a mapping table included in the compressed PDLUT, based on the mapping coefficients, maps the base subset to generate a desired subset, and selects an approximate distortion correction value corresponding to the first data symbol sequence from the desired subset.

Finally at step 3408, the symbol corrector 504 applies the approximate distortion correction value to the under-correct symbol.

It is to be understood that the operations and functionality of various systems and methods, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for pre-compensating an under-correct symbol, the method comprising:
   based on a first data symbol sequence, selecting a base subset from a plurality of base subsets included in a compressed Pattern Dependent Look-up Table (PDLUT);
   in the event that the first data symbol sequence is included in the base subset,
      selecting an approximate distortion correction value corresponding to the first data symbol sequence from the base subset;
   in the event that the first data symbol sequence is not included in the base subset,
      extracting mapping coefficients from a mapping table included in the compressed PDLUT,
      based on the mapping coefficients, mapping the base subset to generate a desired subset, and
      selecting an approximate distortion correction value corresponding to the first data symbol sequence from the desired subset; and
   applying the approximate distortion correction value to the under-correct symbol.

2. The method of claim 1 further comprising:
   in the event that the first data symbol sequence is not included in the desired subset,
      determining a data symbol sequence in the desired subset, which is opposite to the first data symbol sequence,
      selecting an approximate distortion correction value corresponding to the opposite data symbol sequence from the desired subset, and
      negating the approximate distortion correction value corresponding to the opposite data symbol sequence.

3. The method of claim 1 further comprising:
   identifying a second data symbol sequence associated with the under-correct symbol in the PDLUT;
   in the event that the identified second data symbol sequence is included in the PDLUT,
      selecting an approximate distortion correction value corresponding to the identified second data symbol from the PDLUT;
   in the event that the identified second data symbol sequence is not included in the compressed PDLUT,
      determining a data symbol sequence in the compressed PDLUT which is opposite to the identified second data symbol sequence,
      selecting an approximate distortion correction value corresponding to the opposite data symbol sequence from the PDLUT, and
      negating the approximate distortion correction value corresponding to the opposite data symbol sequence; and
   applying the approximate distortion correction value to the under-correct symbol.

4. A system for pre-compensating an under-correct symbol, the system comprising:
   a non-transitory memory element having instructions thereon;
   a processor coupled to the non-transitory memory element and which execute the instructions to cause the processor to:
   based on a first data symbol sequence, select a base subset from a plurality of base subsets included in a compressed Pattern Dependent Look-up Table (PDLUT);
   in the event that the first data symbol sequence is included in the base subset,
      select an approximate distortion correction value corresponding to the first data symbol sequence from the base subset;
   in the event that the first data symbol sequence is not included in the base subset,
      extract mapping coefficients from a mapping table included in the compressed PDLUT,
      based on the mapping coefficients, map the base subset to generate a desired subset, and
      select an approximate distortion correction value corresponding to the first data symbol sequence from the desired subset; and
   apply the approximate distortion correction value to the under-correct symbol.

5. The system of claim 4, wherein the processor is further configured to:
   in the event that the first data symbol sequence is not included in the desired subset,
      determine a data symbol sequence in the desired subset, which is opposite to the first data symbol sequence,
      select an approximate distortion correction value corresponding to the opposite data symbol sequence from the desired subset, and
      negate the approximate distortion correction value corresponding to the opposite data symbol sequence.

6. The system of claim 4, wherein the processor is further configured to:
   identify a second data symbol sequence associated with the under-correct symbol in the PDLUT;
   in the event that the identified second data symbol sequence is included in the PDLUT,
      select an approximate distortion correction value corresponding to the identified second data symbol from the PDLUT;
   in the event that the identified second data symbol sequence is not included in the compressed PDLUT,
      determine a data symbol sequence in the compressed PDLUT which is opposite to the identified second data symbol sequence,
      select an approximate distortion correction value corresponding to the opposite data symbol sequence from the PDLUT,
      negate the approximate distortion correction value corresponding to the opposite data symbol sequence; and
   apply the approximate distortion correction value to the under-correct symbol.

* * * * *